(12) United States Patent
Oda et al.

(10) Patent No.: US 12,549,463 B2
(45) Date of Patent: Feb. 10, 2026

(54) INFORMATION PROCESSING SYSTEM, INFORMATION PROCESSING METHOD AND PROGRAM

(71) Applicant: NTT, Inc., Tokyo (JP)

(72) Inventors: Takuya Oda, Musashino (JP); Takuya Ohara, Musashino (JP); Fumikazu Inuzuka, Musashino (JP); Takafumi Tanaka, Musashino (JP); Masayuki Shimoda, Musashino (JP)

(73) Assignee: NTT, Inc., Tokyo (JP)

( * ) Notice: Subject to any disclaimer, the term of this patent is extended or adjusted under 35 U.S.C. 154(b) by 376 days.

(21) Appl. No.: 18/027,597

(22) PCT Filed: Sep. 29, 2020

(86) PCT No.: PCT/JP2020/036859
§ 371 (c)(1),
(2) Date: Mar. 21, 2023

(87) PCT Pub. No.: WO2022/070247
PCT Pub. Date: Apr. 7, 2022

(65) Prior Publication Data
US 2023/0403220 A1 Dec. 14, 2023

(51) Int. Cl.
*H04L 43/0852* (2022.01)
(52) U.S. Cl.
CPC .................. *H04L 43/0852* (2013.01)
(58) Field of Classification Search
CPC .................. H04L 43/0852; H04L 43/20
See application file for complete search history.

(56) References Cited

U.S. PATENT DOCUMENTS 6,678,524 B1  1/2004 Hansson et al.
6,914,972 B1  7/2005 Baumeister et al.
(Continued)

FOREIGN PATENT DOCUMENTS

EP  3041311 A1  7/2016
JP  H10117215 A  5/1998
(Continued)

OTHER PUBLICATIONS

"Masahiko Jinno, ""Virtualization in Optical Networks from Network Level to Hardware Level [Invited]""", Oct. 2013, Optical Society of America (Year: 2013)".
(Continued)

*Primary Examiner* — Schquita D Goodwin
(74) *Attorney, Agent, or Firm* — Harness, Dickey & Pierce, P.L.C.

(57) ABSTRACT

One aspect of the present invention provides an information processing system in which at least one of a connection between an input/output device and a computing machine or a connection between the computing machine and a central computing machine is made via a network, and a plurality of users uses the same content by using the input/output device via the network, the information processing system including a delay measurement device configured to measure an amount of transmission delay generated between the input/output device and the central computing machine for each of the users, and a delay adjustment device configured to adjust a difference in the amount of transmission delay between the users to be kept within a predetermined value on the basis of the measured amount of transmission delay.

7 Claims, 15 Drawing Sheets

(56) References Cited

U.S. PATENT DOCUMENTS

| | | | |
|---|---|---|---|
| 7,519,049 B2 | 4/2009 | Masuda | |
| 7,822,065 B2 | 10/2010 | Lu | |
| 8,719,534 B1 | 5/2014 | Ray, III et al. | |
| 9,141,420 B2 | 9/2015 | Chang et al. | |
| 9,146,769 B1 | 9/2015 | Shankar et al. | |
| 9,785,478 B1 | 10/2017 | Babu B R et al. | |
| 11,089,105 B1 | 8/2021 | Karumbunathan et al. | |
| 11,301,407 B2 | 4/2022 | Sen et al. | |
| 11,344,803 B1* | 5/2022 | Luo | A63F 13/35 |
| 11,805,026 B2* | 10/2023 | Lackey, Jr. | H04L 7/10 |
| 2003/0184651 A1 | 10/2003 | Ohsawa et al. | |
| 2006/0171713 A1 | 8/2006 | Feng | |
| 2007/0079307 A1 | 4/2007 | Dhawan et al. | |
| 2008/0235361 A1 | 9/2008 | Crosbie et al. | |
| 2009/0240790 A1 | 9/2009 | Utsunomiya et al. | |
| 2010/0042636 A1 | 2/2010 | Lu | |
| 2011/0126047 A1 | 5/2011 | Anderson et al. | |
| 2012/0117563 A1 | 5/2012 | Chang et al. | |
| 2012/0327953 A1 | 12/2012 | Vokkarane et al. | |
| 2013/0262390 A1 | 10/2013 | Kumarasamy et al. | |
| 2014/0019621 A1 | 1/2014 | Khan et al. | |
| 2014/0181984 A1 | 6/2014 | Kundu et al. | |
| 2014/0258533 A1 | 9/2014 | Antony | |
| 2015/0363219 A1 | 12/2015 | Kasturi et al. | |
| 2017/0235817 A1 | 8/2017 | Deodhar et al. | |
| 2018/0191601 A1 | 7/2018 | Micallef | |
| 2019/0042325 A1 | 2/2019 | Nair | |
| 2019/0327144 A1 | 10/2019 | Tembey et al. | |
| 2019/0339320 A1 | 11/2019 | Dzafic | |
| 2020/0195539 A1* | 6/2020 | Sivaraj | H04L 43/0876 |
| 2020/0218684 A1 | 7/2020 | Sen et al. | |
| 2020/0296036 A1* | 9/2020 | Chu | H04L 45/70 |
| 2020/0412657 A1 | 12/2020 | Jang et al. | |
| 2021/0158260 A1* | 5/2021 | Kolar | H04L 67/1044 |
| 2021/0243101 A1* | 8/2021 | Kim | H04L 43/106 |
| 2022/0158756 A1 | 5/2022 | Wang et al. | |
| 2022/0210042 A1* | 6/2022 | Gandhi | H04L 43/0876 |
| 2022/0272046 A1* | 8/2022 | Harmatos | H04L 43/0852 |
| 2022/0368608 A1* | 11/2022 | Chen | H04L 41/5009 |

FOREIGN PATENT DOCUMENTS

| | | | |
|---|---|---|---|
| JP | 2003535526 A | 11/2003 | |
| JP | 2005064970 A | 3/2005 | |
| JP | 2006527541 A | 11/2006 | |
| JP | 2010521761 A | 6/2010 | |
| JP | 2012505561 A | 3/2012 | |
| JP | 2015065527 A | 4/2015 | |
| JP | 2015527649 A | 9/2015 | |
| KR | 10-2014-0003200 A | 1/2014 | |
| WO | WO-01/93607 A1 | 12/2001 | |
| WO | WO-2004111775 A2 | 12/2004 | |
| WO | WO-2010041582 A1 | 4/2010 | |
| WO | WO-2015029416 A1 | 3/2015 | |
| WO | WO-2020143380 A1 | 7/2020 | |

OTHER PUBLICATIONS

Ramesh Govindan et al., An Architecture for Stable, Analyzable Internet Routing, IEEE Network, vol. 13, issue 1, pp. 29-35, 1999.

Yang Chen et al., Optical Burst Switching: A New Area in Optical Networking Research, IEEE Network, vol. 18, issue 3, pp. 16-23, 2004.

Aten International Co., Ltd. KE6920 datasheet, ver. 01, Jun. 17, 2020, 1-5, https://assets.aten.com/product/spec_sheet/JP/ke6920-6922_ver01j.pdf, ATEN Product Information KE6920.

Takamichi Nishijima et al., On the Impact of Network Environment on Remote Desktop Protocols, IEICE Technical Report CQ2012-21 (Jul. 2012), 2012, pp. 23-28.

Bijoy Chand Chatterjee et al., Routing and Wavelength Assignment for WDM-based Optical Networks, Springer, pp. 35-43, vol. 410, 2017.

Wei Lu et al., Dynamic Service Provisioning of Advance Reservation Requests in Elastic Optical Networks, Journal of Lightwave Technology, vol. 31, Issue. 10, 2013, pp. 1621-1627.

M. Jinno et al., An Overview of Elastic Optical Networks, Proceedings of the 2013 Ieice Communications Society Conference, 2013, p. SS-98-SS-99.

Pegah Afsharlar et al., Routing and Spectrum Assignment with Delayed Allocation in Elastic Optical Networks, Journal of Optical Communications and Networking, 2017, pp. 1-10.

K. Yamaguchi et al., M x N Wavelength Selective Switches Using Beam Splitting By Space Light Modulators, IEEE Photonics Journal, vol. 8, No. 1, Feb. 2016.

R. A. Wagner and S. E. Dreyfus, The Steiner Problem in Graphs, Networks 1, Dreyfus and Wagner, pp. 195-207, 1972.

Y. Liu et al., The Degree-Constrained Multicasting Algorithm Using Ant Algorithm, Proceedings of the 10th International Conference on Telecommunications, 2003, pp. 370-374.

Ryan Shea and Jiangchuan Liu, Cloud Gaming: Architecture and Performance, IEEE Network . Jul./Aug. 2013, IEEE 2013, pp. 16-21.

International Search Report issued in PCT/JP2020/036303, mailed on Feb. 2, 2021; ISA/JP.

International Search Report issued in PCT/JP2020/039655, mailed on Feb. 16, 2021; ISA/JP.

* cited by examiner

INFORMATION PROCESSING SYSTEM, INFORMATION PROCESSING METHOD AND PROGRAM

CROSS-REFERENCE TO RELATED APPLICATIONS

This application is a 371 U.S. National Phase of International Application No. PCT/JP2020/036859, filed on Sep. 29, 2020. The entire disclosure of the above application is incorporated herein by reference.

TECHNICAL FIELD

The present invention relates to technologies of an information processing system, an information processing method, and a program.

BACKGROUND ART

In recent years, events attended by a plurality of users have been held remotely via a network. Examples of the events include eSports, gaming, and online transactions (e.g., auctions). In a case of a large-scale online event, a plurality of computing machines is connected to a central server or the like with the use of a cloud environment from a conventional local communication environment (see, for example, Non Patent Literature 1).

In addition, a device called a keyboard, video, and mouse (KVM) extender is used as a device that allows a UI device to be installed at a location physically away from a computing machine.

FIG. 21 is a diagram illustrating a configuration example of an information processing system in a conventional technology. As illustrated in FIG. 21, the information processing system includes user systems 900 (900a, 900b, . . . , 900z), computing systems 910 (910a, 910b, . . . , 910z), and a central computing system 920.

The user systems 900 include input/output devices 901 (901a, 901b, . . . , 901z) such as an image display device, a keyboard, a mouse, or a tablet, input/output management devices 902 (902a, 902b, . . . , 902z) that manage the input/output devices 901, and input/output signal transmission/reception devices 903 (903a, 903b, . . . , 903z) having a communication function.

The computing systems 910 include input/output signal transmission/reception devices 911 (911a, 911b, . . . , 911z) that transmit and receive information to and from the user systems 900, computing machines 912 (912a, 912b, . . . , 912z) that process information, and input/output signal transmission/reception devices 913 (913a, 913b, . . . , 913z) that transmit and receive information to and from the central computing system 920.

The central computing system 920 includes a signal transmission/reception device 921 having a communication function and a central computing machine 922 that adjusts and controls the entire content.

The user systems 900 and the computing systems 910 are connected by first networks, and the computing systems 910 and the central computing system 920 are connected by second networks. Note that the networks may be either wired or wireless.

In FIG. 21, Tfa is the amount of delay generated between the user system 900a and the computing system 910a, Tfb is the amount of delay generated between the user system 900b and the computing system 910b, . . . , and Tfz is the amount of delay generated between the user system 900z and the computing system 910z. In addition, Tba is the amount of delay generated between the computing system 910a and the central computing system 920, Tbb is the amount of delay generated between the computing system 910b and the central computing system 920, . . . , and Tbz is the amount of delay generated between the computing system 910z and the central computing system 920.

In general, devices in different sites are rarely in the same delay environment, and thus, the amounts of delay Tfa, Tfb, . . . , and Tfz are often different from each other. In addition, the amounts of delay Tba, Tbb, . . . , and Tbz are often different from each other for similar reasons.

CITATION LIST

Non Patent Literature

Non Patent Literature 1: Ryan Shea and Jiangchuan Liu, "Cloud Gaming: Architecture and Performance", IEEE Network July/August 2013, IEEE, 2013, p 16-p 21

SUMMARY OF INVENTION

Technical Problem

FIG. 22 is a diagram illustrating an amount of delay of each user in a conventional technology. In a conventional information processing system, each user has individually achieved the lowest possible delay, and this has resulted in a difference in delay between a plurality of users using the same content as illustrated in FIG. 22. As a result, since a user with less amount of delay is advantageous in many pieces of content, it is difficult to hold a highly competitive event in an equal environment. In addition, in a case where a packet-switched network such as the Internet is used in the network, the amount of delay greatly fluctuates over time due to a service provider or an external factor.

In view of the above circumstances, the present invention is aimed at providing a technology that allows for a reduction in difference in amount of delay between users.

Solution to Problem

One aspect of the present invention provides an information processing system in which at least one of a connection between an input/output device and a computing machine or a connection between the computing machine and a central computing machine is made via a network, and a plurality of users uses the same content by using the input/output device via the network, the information processing system including: a delay measurement device configured to measure an amount of transmission delay generated between the input/output device and the central computing machine for each of the users; and a delay adjustment device configured to adjust a difference in the amount of transmission delay between the users to be kept within a predetermined value on the basis of the measured amount of transmission delay.

One aspect of the present invention provides an information processing method in an information processing system in which at least one of a connection between an input/output device and a computing machine or a connection between the computing machine and a central computing machine is made via a network, and a plurality of users uses the same content by using the input/output device via the network, the method including: measuring, by a delay measurement device, an amount of transmission delay generated between the input/output device and the central computing machine for each of the users; and adjusting, by a delay adjustment device, a difference in the amount of transmission delay between the users to be kept within a predetermined value on the basis of the measured amount of transmission delay.

One aspect of the present invention provides a program for causing a computer of a delay adjustment device in an information processing system, in which at least one of a connection between an input/output device and a computing machine or a connection between the computing machine and a central computing machine is made via a network, and a plurality of users uses the same content by using the input/output device via the network, to execute: measurement of an amount of transmission delay generated between the input/output device and the central computing machine for each of the users; and adjustment of a difference in the amount of transmission delay between the users to be kept within a predetermined value on the basis of the measured amount of transmission delay.

Advantageous Effects of Invention

According to the present invention, it is possible to improve an operational feeling when a user interface device and a computing machine are installed away from each other.

DESCRIPTION OF EMBODIMENTS

An embodiment of the present invention will be described below with reference to the drawings.

First Embodiment

Figure 1:
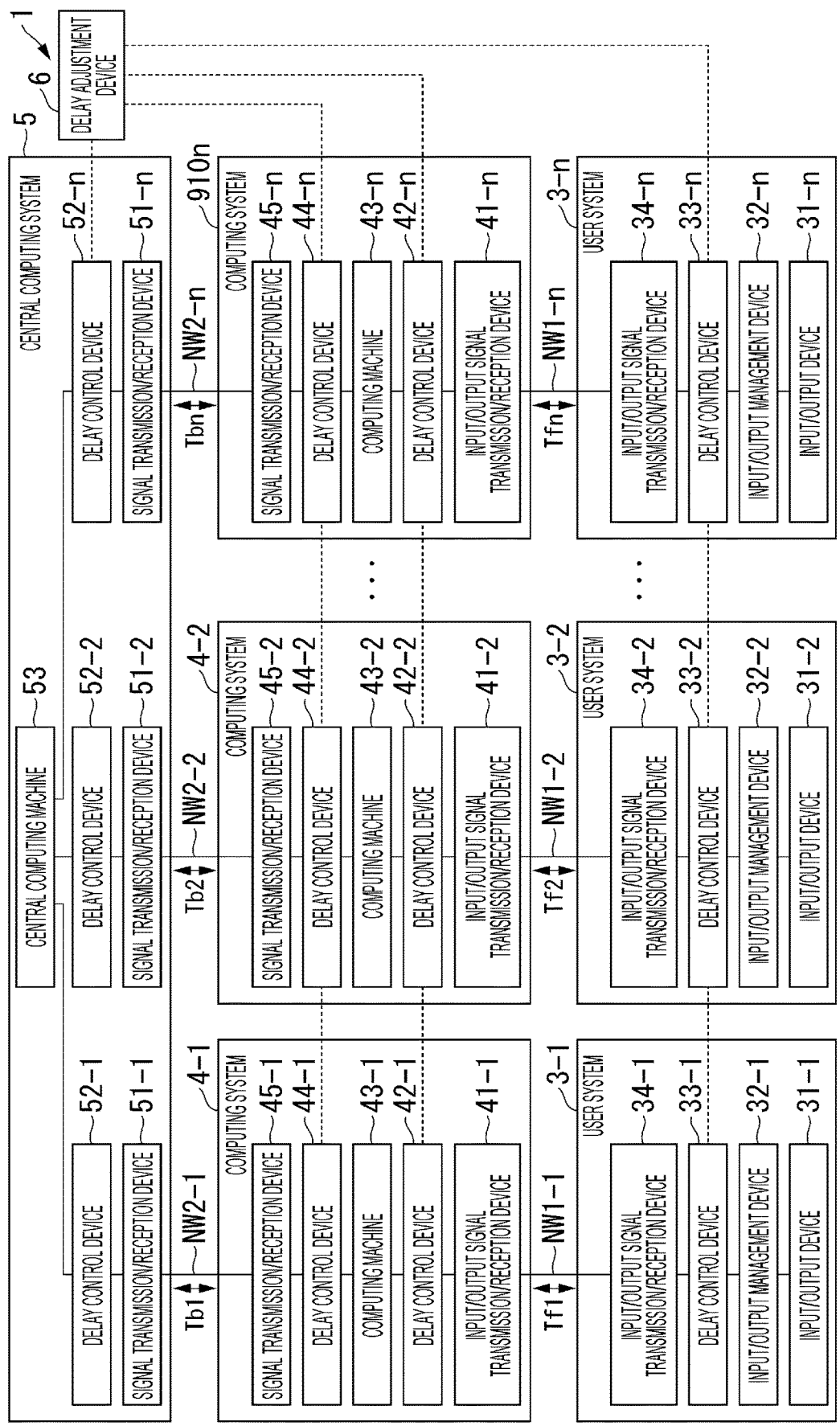
FIG. 1 is a diagram illustrating an example of an overall configuration of an information processing system according to an embodiment.

FIG. 1 is a diagram illustrating an example of an overall configuration of an information processing system according to the present embodiment. As illustrated in FIG. 1, an information processing system 1 includes user systems 3 (3-1, 3-2, . . . , 3-n (n is an integer equal to or larger than 2)), computing systems 4 (4-1, 4-2, . . . , 4-n), a central computing system 5, and a delay adjustment device 6.

The user systems 3 include, for example, input/output devices 31 (31-1, 31-2, . . . , 31-n), input/output management devices 32 (32-1, 32-2, . . . , 32-n), delay control devices 33 (33-1, 33-2, . . . , 33-n), and input/output signal transmission/reception devices 34 (34-1, 34-2, . . . , 34-n).

The computing systems 4 include, for example, input/output signal transmission/reception devices 41 (41-1, 41-2, . . . , 41-n), first delay control devices 42 (42-1, 42-2, . . . , 42-n), computing machines 43 (43-1, 43-2, . . . , 43-n), second delay control devices 44 (44-1, 44-2, . . . , 44-n), and signal transmission/reception devices 45 (45-1, 45-2, . . . , 45-n).

Note that the user systems 3 and the computing systems 4 are connected by first networks NW1 (NW1-1, NW1-2, . . . , NW1-n). The first networks NW1 may be either wired networks or wireless networks, may be optionally based on physical topology or logical topology, and may be either circuit switched networks or packet switched networks. In addition, the first networks NW1-1, NW1-2, . . . , NW1-n may be the same or different in communication system. The first networks NW1 are, for example, the Internet, and may include a communication network and a roaming data transfer network. Note that the communication network and the roaming data transfer network may be integrated or separated. In addition, the first networks NW1 may have an authentication function.

The central computing system 5 includes, for example, signal transmission/reception devices 51 (51-1, 51-2, . . . , 51-n), delay control devices 52 (52-1, 52-2, . . . , 52-n), and a central computing machine 53.

Note that the computing systems 4 and the central computing system 5 are connected by second networks NW2 (NW2-1, NW2-2, . . . , NW2-n). The second networks NW2 may be either wired networks or wireless networks, may be optionally based on physical topology or logical topology, and may be either circuit switched networks or packet switched networks. In addition, the second networks NW2-1, NW2-2, . . . , NW2-n may be the same or different in communication system.

In addition, the delay adjustment device 6 is connected with the delay control devices 33 of the user systems 3, connected with the first delay control devices 42 of the computing systems 4, connected with the second delay control devices 44 of the computing systems 4, and connected with the delay control devices 52 of the central computing system 5.

First, the user systems 3 will be described.

Examples of the input/output devices 31 include image display devices, keyboards, mouses, game controllers, tablets, scanners, printers, and speakers. The input/output devices 31 are connected to the input/output management devices 32.

The input/output management devices 32 manage output of information to the input/output devices 31, output of information from the input/output devices 31, and the like. The input/output management devices 32 are connected to the delay control devices 33.

Together with the first delay control devices 42 of the computing systems 4, the delay control devices 33 measure amounts of transmission delay generated between the user systems 3 and the computing systems 4 (hereinafter, an "amount of transmission delay generated between A and B" is referred to as an "amount of delay between A and B"), the amounts of transmission delay being amounts of delay generated between the input/output devices 31 and the computing machines 43, and output delay information indicating the measured amounts of delay to the delay adjustment device 6. The delay control devices 33 adjust the amounts of delay between the user systems 3 and the computing systems 4 in accordance with the control of the delay adjustment device 6. The delay control devices 33 are connected to the input/output signal transmission/reception devices 34.

The input/output signal transmission/reception devices 34 receive signals from the computing systems 4, and output the received signals to the input/output management devices 32 via the delay control devices 33. The input/output signal transmission/reception devices 34 acquire signals output from the input/output management devices 32 via the delay control devices 33, and transmit the acquired signals to the computing systems 4. Note that the signals from the computing systems 4 include, for example, image signals and audio signals. In addition, the signals from the user systems 3 to the computing systems 4 include, for example, information regarding keyboard operation and mouse operation.

Next, the computing systems 4 will be described.

Examples of the computing systems 4 include data centers, communication buildings, and server rooms.

The input/output signal transmission/reception devices 41 receive signals output from the user systems 3, and output the received signals to the computing machines 43 via the first delay control devices 42. The input/output signal transmission/reception devices 41 acquire signals output from the computing machines 43 via the delay control devices 33, and transmit the acquired signals to the user systems 3. The input/output signal transmission/reception devices 41 are connected to the first delay control devices 42.

Together with the delay control devices 33 of the user systems 3, the first delay control devices 42 measure amounts of delay between the user systems 3 and the computing systems 4, the amounts of delay being amounts of delay between the input/output devices 31 and the computing machines 43, and output delay information indicating the measured amounts of delay to the delay adjustment device 6. The first delay control devices 42 adjust the amounts of delay between the user systems 3 and the computing systems 4 in accordance with the control of the delay adjustment device 6. The first delay control devices 42 are connected to the computing machines 43.

The computing machines 43 perform processing and control on content in accordance with signals output from the user systems 3. The computing machines 43 may be physical computing machines, or may be logical computing machines (virtual computing machines). In the case of the virtual computing machines, for example, a CPU, a graphics processing unit (GPU), a memory, a storage, and the like are virtualized. Furthermore, the computing machines 43 may be game equipment.

Together with the delay control devices 52 of the central computing system 5, the second delay control devices 44 measure amounts of delay between the computing systems 4 and the central computing system 5, the amounts of delay being amounts of delay between the computing machines 43 and the central computing machine 53, and output delay information indicating the measured amounts of delay to the delay adjustment device 6. The second delay control devices 44 adjust the amounts of delay between the computing systems 4 and the central computing system 5 in accordance with the control of the delay adjustment device 6. The second delay control devices 44 are connected to the signal transmission/reception devices 45.

The signal transmission/reception devices 45 transmit signals output from the computing machines 43 to the central computing system 5. The signal transmission/reception devices 45 receive signals from the central computing system 5, and output the received signals to the computing machines 43 via the second delay control devices 44.

Next, the central computing system 5 will be described.

The signal transmission/reception devices 51 receive signals transmitted by the computing systems 4, and output the received signals to the central computing machine 53 via the delay control devices 52. The signal transmission/reception devices 51 acquire signals from the central computing machine 53 via the delay control devices 52, and transmit the acquired signals to the computing systems 4. The signal transmission/reception devices 51 are connected to the delay control devices 52.

Together with the second delay control devices 44 of the computing systems 4, the delay control devices 52 measure amounts of delay between the computing systems 4 and the central computing system 5, the amounts of delay being amounts of delay between the computing machines 43 and the central computing machine 53, and output delay information indicating the measured amounts of delay to the delay adjustment device 6. The delay control devices 52 adjust the amounts of delay between the computing systems 4 and the central computing system 5 in accordance with the control of the delay adjustment device 6. The delay control devices 52 are connected to the central computing machine 53.

The central computing machine 53 is, for example, a server. The central computing machine 53 communicates with each computing machine, and performs processing in accordance with the content. The central computing machine 53 configures settings of a room, a group of users, and the like. Note that the room and the group of users will be described later.

In the example in FIG. 1, the "delay control devices" are provided in both communication sections so that delay is measured and adjusted on the signal reception side, but the configuration is not limited thereto. In a use case where delay adjustment is performed only in one direction (e.g., video distribution), the "delay control devices" on the transmission side may be omitted.

In addition, the "delay control devices" are not limited to independent physical devices, but may be implemented as functional units built in devices connected to the vicinity of the delay control devices. The "functional units built in devices" means, for example, implementation as internal functions of the signal transmission/reception devices 45, or logical implementation as applications inside the computing machines 43.

Next, the delay adjustment device 6 will be described.

The delay adjustment device 6 acquires user information from the user systems 3 or the like, and transmits the acquired user information to the central computing system 5. Note that the user information may include information such as the number of users, a room being used or selected by a user, and a group of users to which a user belongs. The delay adjustment device 6 instructs each of the delay control devices (33, 42, 44, and 52) to measure the amount of delay of each user, and acquires measurement results. The delay adjustment device 6 adjusts the amounts of delay on the basis of the acquired amount of delay of each user.

The computing machines 43, the central computing machine 53, and the delay adjustment device 6 are constituted by memories and processors such as central processing units (CPUs). All or some of the functions of the computing machines 43, the central computing machine 53, and the delay adjustment device 6 may be constituted by hardware such as an application specific integrated circuit (ASIC), a programmable logic device (PLD), or a field programmable gate array (FPGA). The program may be recorded in a computer-readable recording medium. Examples of the computer-readable recording medium include a portable medium such as a flexible disk, a magneto-optical disk, a ROM, a CD-ROM, or a semiconductor storage device (e.g., a solid state drive (SSD)), and a storage device such as a hard disk or a semiconductor storage device built in a computer system. The program may be transmitted via an electric communication line.

Next, an example of a method of measuring the amount of delay will be described with reference to FIG. 2.

Figure 2:
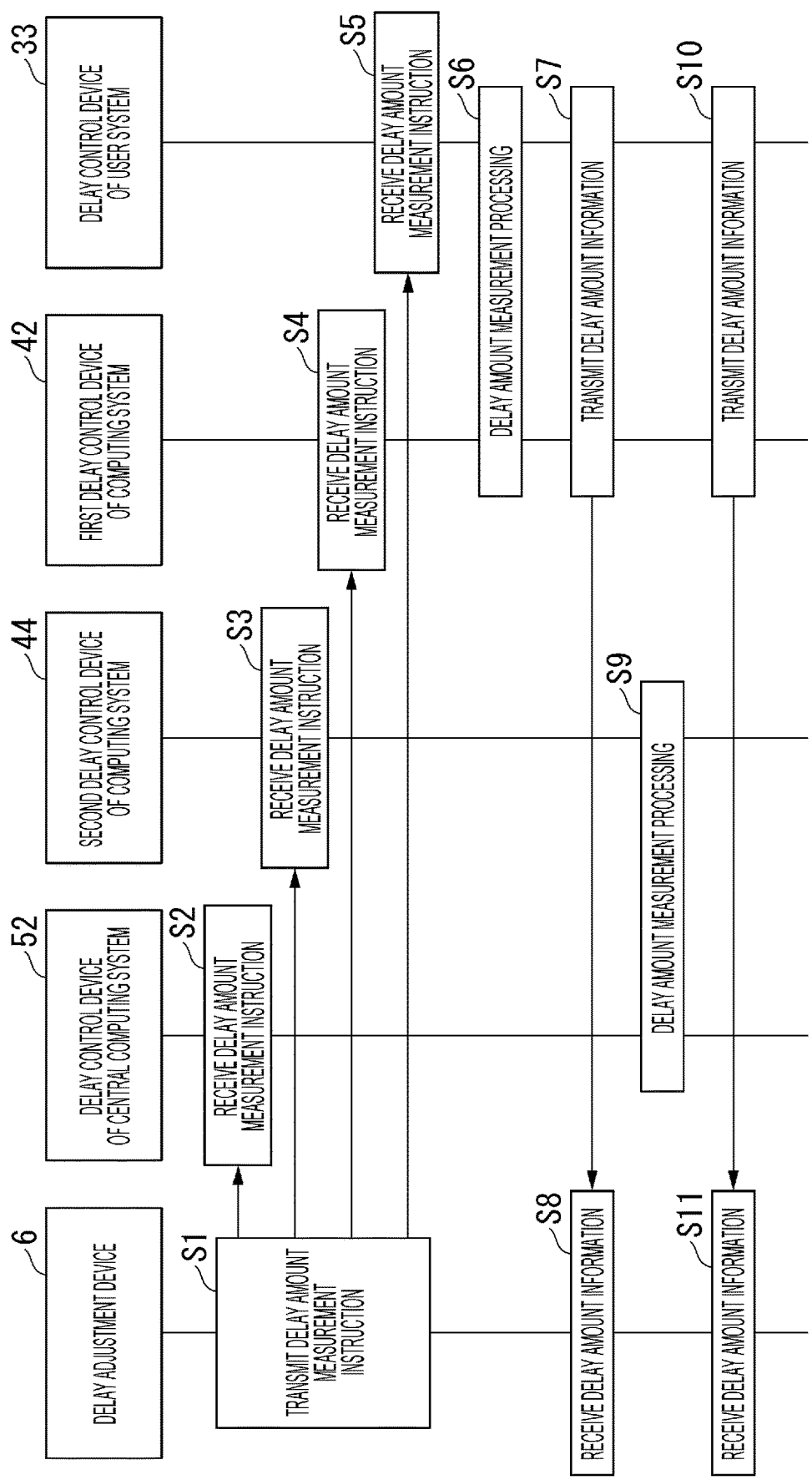
FIG. 2 is a sequence diagram illustrating an example of a procedure of delay amount measurement according to the embodiment.

FIG. 2 is a sequence diagram illustrating an example of a procedure of delay amount measurement according to the present embodiment.

For example, before the start of use of the computing machines 43, the delay adjustment device 6 causes each of the delay control devices (33, 42, 44, and 52) to measure in advance the total amount of delay from the user systems 3 to the computing systems 4 to the central computing system 5.

The delay adjustment device 6 transmits a delay amount measurement instruction to each of the delay control devices (33, 42, 44, and 52) (step S1). Each of the delay control devices receives the delay amount measurement instruction (steps S2 to S5).

In accordance with the control of the delay adjustment device 6, the first delay control devices 42 of the computing systems 4 transmit the delay amount measurement instruction to the user systems 3 via the input/output signal transmission/reception devices 41, and start delay amount measurement counting. When receiving the delay amount measurement instruction, the delay control devices 33 of the user systems 3 transmit reception information indicating the reception to the computing systems 4 via the input/output signal transmission/reception devices 34. The first delay control devices 42 receive the reception information from the user systems 3 via the input/output signal transmission/ reception devices 41, and end the delay amount measurement counting (step S6). Note that the measurement may be performed by the delay control devices 33 on the user systems 3 side. As described above, the amounts of delay are, for example, delay times between the delay control devices 33 of the user systems 3 and the first delay control devices 42 of the computing systems 4.

The first delay control devices 42 or the delay control devices 33 transmit information regarding the measured amounts of delay to the delay adjustment device 6 (step S7). The delay adjustment device 6 receives the information regarding the measured amounts of delay (step S8).

Furthermore, for example, the second delay control devices 44 of the computing systems 4 transmit delay amount measurement instructions to the central computing system 5 via the signal transmission/reception devices 45, and start delay amount measurement counting in accordance with the control of the delay adjustment device 6. When receiving the delay amount measurement instructions, the delay control devices 52 of the central computing system 5 transmit reception information indicating the reception to the computing systems 4 via the signal transmission/reception devices 51. The second delay control devices 44 receive the reception information from the central computing system 5 via the signal transmission/reception devices 45 central computing system 5, and ends the delay amount measurement counting (step S9). Note that the measurement may be performed by the delay control devices 52 on the central computing system 5 side. As described above, the amounts of delay are, for example, delay times between the second delay control devices 44 of the computing systems 4 and the delay control devices 52 of the central computing system 5.

The second delay control devices 44 or the delay control devices 52 transmit information regarding the measured amounts of delay to the delay adjustment device 6 (step S10). The delay adjustment device 6 receives the information regarding the measured amounts of delay, and stores each piece of the received information regarding the amounts of delay (step S11).

Note that measurement of the amounts of delay between the user systems 3 and the computing systems 4 and measurement of the amounts of delay between the computing systems 4 and the central computing system 5 may be performed simultaneously. The delay amount measurement may be executed at any timing except for measurement prior to delay adjustment. In addition, each of the delay control devices may perform periodical execution with a timeout and sequentially transmit the results to the delay adjustment device 6. In addition, in a case where a measurement result is compared with a past result and the difference is within an allowable range (e.g., less than 1 (ms)), each of the delay control devices may omit transmission of information to the delay adjustment device 6.

Note that this measurement of the amounts of delay is performed for all the user systems 3 and the computing systems 4 connected to the content handled by the central computing machine 53.

Figure 3:
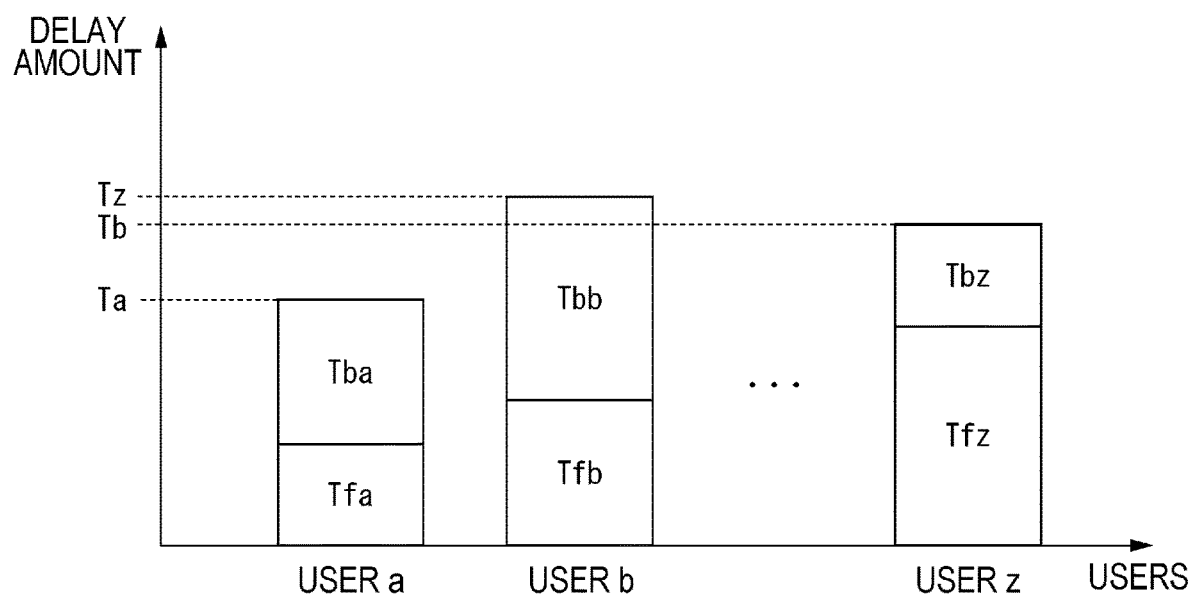
FIG. 3 is a diagram illustrating an example of a total amount of delay from a user system to a computing system to a central computing system before adjustment.

FIG. 3 is a diagram illustrating an example of the total amount of delay from the user systems 3 to the computing systems 4 to the central computing system 5 before adjustment. In FIG. 3, the horizontal axis represents the user, and the vertical axis represents the amount of delay. In FIG. 3, Tfa is the amount of delay between the user system 3-1 and the computing system 4-1 (e.g., 20 (ms)), Tfb is the amount of delay between the user system 3-2 and the computing system 4-2 (e.g., 30 (ms)), and Tfz is the amount of delay between a user system 3-z and a computing system 4-z (e.g., 40 (ms)). In addition, Tba is the amount of delay between the computing system 4-1 and the central computing system 5 (e.g., 30 (ms)), Tbb is the amount of delay between the computing system 4-2 and the central computing system 5 (e.g., 40 (ms)), and Tbz is the amount of delay between the computing system 4-z and the central computing system 5 (e.g., 20 (ms)).

The total amount of delay from the user system 3-1 to the computing system 4-1 to the central computing system 5 is Ta (=Tfa+Tba). The total amount of delay from the user system 3-2 to the computing system 4-2 to the central computing system 5 is Tb (=Tfb+Tbb). The total amount of delay from the user system 3-z to the computing system 4-z to the central computing system 5 is Tz (=Tfz+Tbz). Ta is the smallest total amount of delay, and Tb is the largest total amount of delay.

Next, an example of a method of adjusting the amount of delay will be described with reference to FIG. 4.

Figure 4:
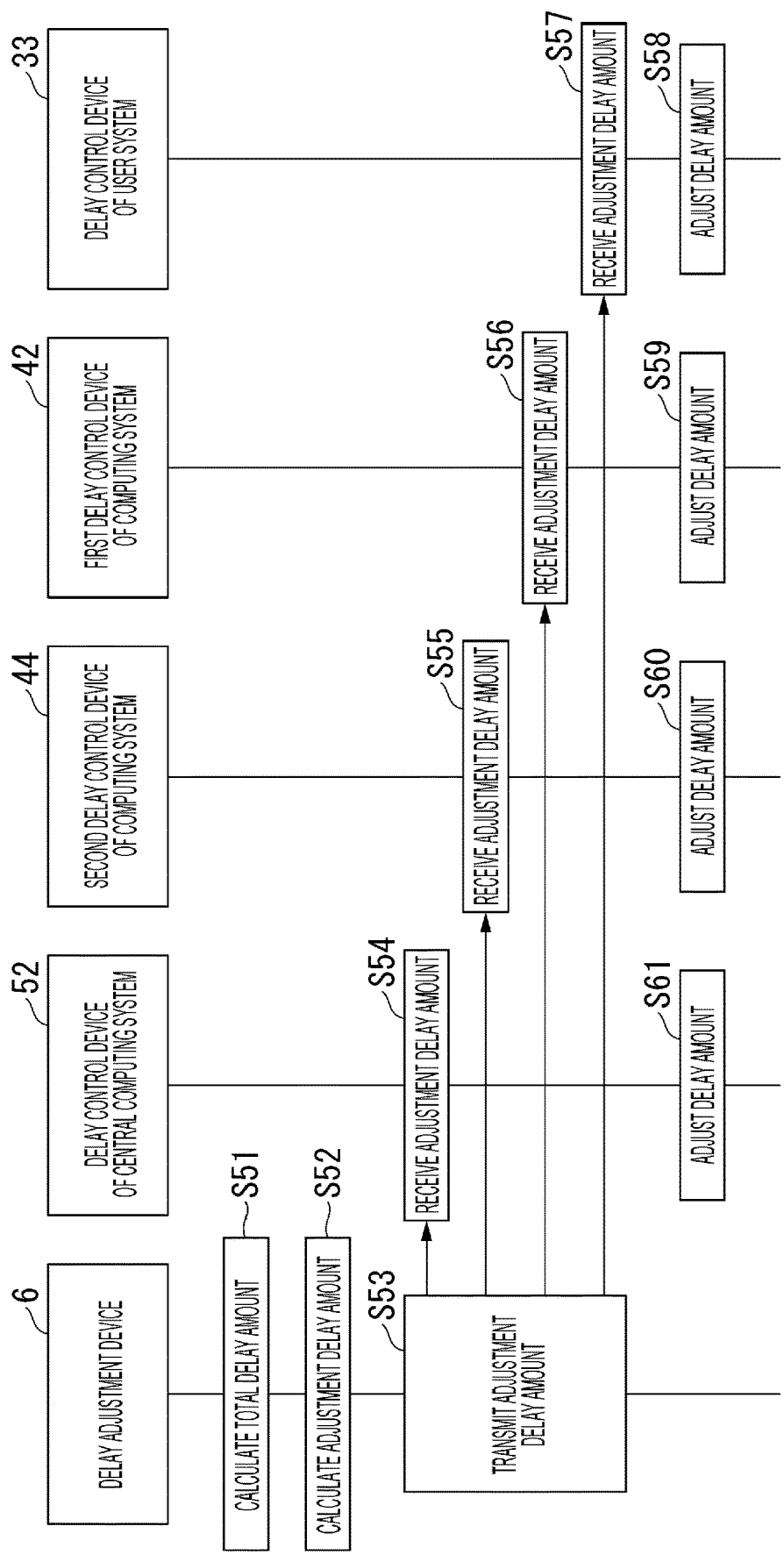
FIG. 4 is a sequence diagram illustrating an example of a procedure of delay amount adjustment according to the embodiment.

FIG. 4 is a sequence diagram illustrating an example of a procedure of delay amount adjustment according to the present embodiment.

The delay adjustment device 6 calculates the total amount of delay from the user systems 3 to the computing systems 4 to the central computing system 5 on the basis of delay amount information received from each of the delay control devices (step S51).

The delay adjustment device 6 calculates an adjustment delay amount on the basis of the delay amount information received from each of the delay control devices and the calculated total amount of delay (step S52). The delay adjustment device 6 transmits information regarding the adjustment delay amount that has been calculated to each of the delay control devices (step S53). Each of the delay control devices receives the information regarding the adjustment delay amount (steps S54 to S57). The information regarding the adjustment delay amount may include information indicating which of the delay control devices is the one to adjust the amount of delay. Alternatively, the delay adjustment device 6 may transmit the information regarding the adjustment delay amount to the delay control device that is to perform delay amount adjustment.

Each of the delay control devices adjusts the amount of delay on the basis of the received information regarding the adjustment delay amount (steps S58 to S61).

Figure 5:
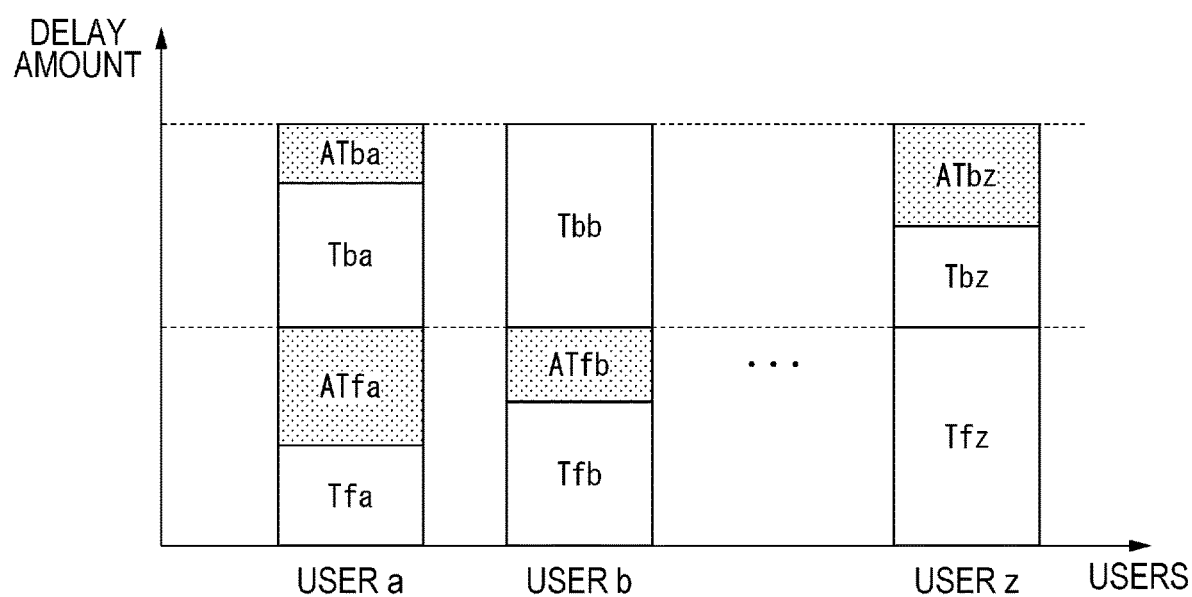
FIG. 5 is a diagram illustrating an example of an amount of delay after adjustment.

FIG. 5 is a diagram illustrating an example of the amount of delay after adjustment. In FIG. 5, the horizontal axis represents the user, and the vertical axis represents the amount of delay.

The delay adjustment device 6 adjusts the amounts of delay between the user systems 3 and the computing systems 4. On the basis of information regarding measurement of the amounts of delay between all the user systems, the computing systems, and the central computing system, the adjustment delay amounts are calculated such that the delays "between the central computing machine and the computing machines" and the delays "between the computing machines and the user systems" fall within an allowable range between all the users. On the basis of the calculated adjustment delay amounts for each user, the delay control devices in the transmission path of each user are set to add delays. In the example in FIG. 1, there are two communication sections, one between the "input/output equipment" and the "computing machines" and the other between the "computing machines" and the "central computing machine", and the delays in each communication section are adjusted to be equal between the users.

For example, the delay adjustment device 6 adjusts, to the largest amount of delay Tfz, other amounts of delay. The delay adjustment device 6 therefore controls the delay control devices of the user system 3-1 and the computing system 4-1 to make an adjustment of adding an adjustment delay amount ATfa (=Tfz−Tfa) to the amount of delay Tfa. In addition, the delay adjustment device 6 controls the delay control devices of the user system 3-2 and the computing system 4-2 to make an adjustment of adding an adjustment delay amount ATfb (=Tfz−Tfb) to the amount of delay Tfb.

Next, the delay adjustment device 6 adjusts the amounts of delay between the user systems 3 and the computing systems 4. For example, the delay adjustment device 6 adjusts, to the largest amount of delay Tbb, other amounts of delay. The delay adjustment device 6 therefore controls the delay control devices of the computing system 4-1 and the central computing system 5 to make an adjustment of adding an adjustment delay amount Alba (=Tbb−Tba) to the amount of delay Tba. In addition, the delay adjustment device 6 controls the delay control devices of the computing system 4-z and the central computing system 5 to make an adjustment of adding an adjustment delay amount ATbz (=Tbb−Tbz) to the amount of delay Tbz.

Note that the delay adjustment device 6 may make a comparison between total amounts of delay or amounts of delay in units of 1 (ms), for example, and may regard that the total amounts of delay or the amounts of delay are the same in a case where the total amounts of delay or the amounts of delay are in a predetermined range. Alternatively, the units may be changed (e.g., from units of 1 (ms) to units of 0.1 (ms)) depending on a service environment, the content to be used, or the like.

Note that the measurement method and the adjustment method described above are examples, and the methods are not limited thereto. In a case where the amount of delay fluctuates over time (e.g., in a case where a fluctuation is detected by delay measurement at an optional timing), the amount of delay may be adjusted again. In a case where there is a change (increase or decrease) in the number of users connected to the content to be handled, the above-described processing may be executed again and the amount of delay may be adjusted in a similar manner.

Note that the amount of delay may be adjusted with the use of, for example, the following well-known technologies (References 1 and 2).

(Reference 1) T. Ono et al., "Novel ODU path switching for ODU reallocation without bit disruption using dynamic delay control scheme", IEEE, 2011 Optical Fiber Communication Conference and Exposition and the National Fiber Optic Engineers Conference, 2011

(Reference 2) Yuki FUJIZAKI et al., "P2P-TV Traffic Engineering by Location-Based Delay Insertion", The Institute of Electronics, Information and Communication Engineers, 2013, Journal of the Institute of Electronics, Information and Communication Engineers B Vol. J96-B No. 8, p. 819-830

According to the present embodiment, the amount of delay is adjusted as described above, and this allows for establishment of fair communication environments for a plurality of users.

Note that the two communication sections, one between the "input/output equipment" and the "computing machines" and the other between the "computing machines" and the "central computing machine", may use a network including a packet-switched network such as the Internet, or may use a network including a circuit-switched network such as optical communication. The present embodiment uses a network including a circuit-switched network to reduce the amount of fluctuation in delay as compared with a packet-switched network, and reduce the frequency of changing the amount of delay adjustment.

Implementation Example

Next, an example of implementing the information processing system will be described.

Figure 6:
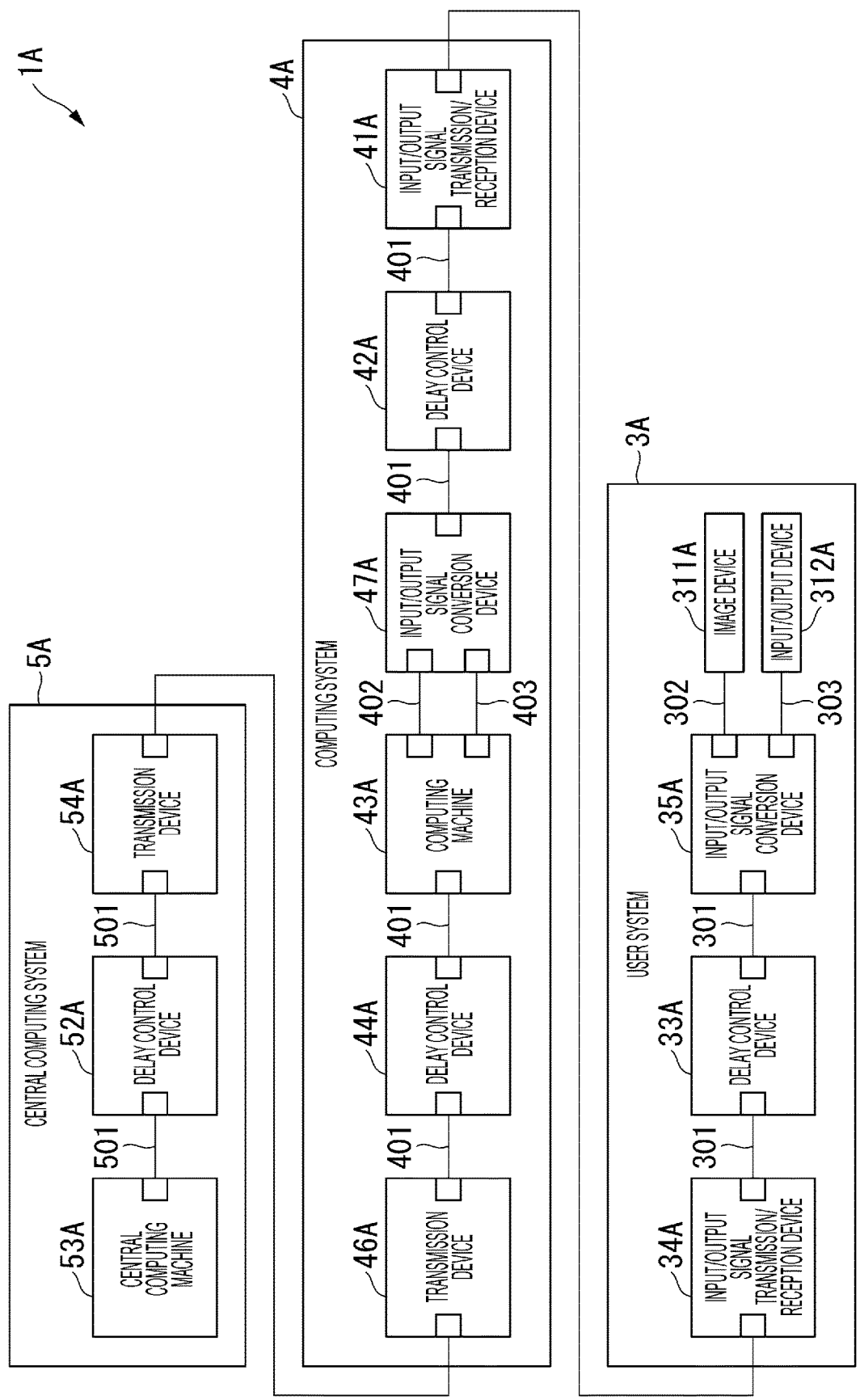
FIG. 6 is a diagram illustrating an example of implementing the information processing system of the embodiment.

FIG. 6 is a diagram illustrating an example of implementing the information processing system of the present embodiment.

As illustrated in FIG. 6, a user system 3A includes, for example, an input/output signal transmission/reception device 34A, a delay control device 33A, an input/output signal conversion device 35A, an image device 311A, and an input/output device 312A.

For example, the input/output signal conversion device 35A converts a signal received from a computing system 4A into an image signal in accordance with the high-definition multimedia interface (HDMI) (registered trademark) standard, or converts a signal output from the input/output device 312A into a signal that can be transmitted.

The input/output signal transmission/reception device 34A receives a signal from the computing system 4A, and transmits a signal from the input/output signal transmission/reception device 34A itself to the computing system 4A.

The delay control device 33A measures an amount of delay between the user system 3A and the computing system 4A and controls the amount of delay.

Examples of the image device 311A include a liquid crystal image display device and an organic electro-luminescence (EL) image display device.

The input/output device 312A is a device related to a user interface, and is, for example, a keyboard, a mouse, an operation controller (actuator), a camera, a virtual reality (VR) headset, an augmented reality (AR) headset, a microphone, or a speaker. Alternatively, other than those described above, the input/output device 312A may be any device that inputs and outputs five human senses (touch, sight, hearing, smell, and taste) together with a computing machine 43A. Alternatively, the input/output device 312A may be a sensor. Examples of the sensor include a sensor that detects movement of a user's hand, face, or body, a position sensor, an altitude sensor, a speed sensor, an acceleration sensor, a temperature sensor, a humidity sensor, a pressure sensor, a vibration sensor, an optical sensor, a sound sensor, an electric field sensor, and a magnetic field sensor.

The input/output signal transmission/reception device 34A and the delay control device 33A, and the delay control device 33A and the input/output signal conversion device 35A are connected by, for example, an Ethernet (registered trademark) cable 301. Furthermore, the input/output signal conversion device 35A and the image device 311A are connected by, for example, an HDMI standard cable 302, and the input/output signal conversion device 35A and the input/output device 312A are connected by, for example, a universal serial bus (USB) standard cable 303. Note that the input/output signal conversion device 35A and the image device 311A may be connected by Displayport, USB Type-C, or the like, or may use one input/output format including a USB signal used in control equipment (e.g., signals of the two are transmitted through USB Type-C).

The computing system 4A includes, for example, a transmission device 46A, a second delay control device 44A, the computing machine 43A, an input/output signal conversion device 47A, a first delay control device 42A, and an input/output signal transmission/reception device 41A.

The transmission device 46A receives a signal from a central computing system 5A, and transmits a signal from the transmission device 46A itself to the central computing system 5A.

The second delay control device 44A measures an amount of delay between the central computing system 5A and the computing system 4A and controls the amount of delay.

The computing machine 43A performs processing in accordance with the content.

For example, the input/output signal conversion device 47A converts a signal received from the central computing system 5A into a signal that can be transmitted to the user system 3A, or converts a signal received from the user system 3A into a signal that can be transmitted to the central computing system 5A.

The first delay control device 42A measures an amount of delay between the user system 3A and the computing system 4A and controls the amount of delay.

The input/output signal transmission/reception device 41A receives a signal from the user system 3A, and transmits a signal from the input/output signal transmission/reception device 41A itself to the user system 3A.

For example, Ethernet cables 401 connect between the transmission device 46A and the second delay control device 44A, between the second delay control device 44A and the computing machine 43A, between the input/output signal conversion device 47A and the first delay control device 42A, and between the first delay control device 42A and the input/output signal transmission/reception device 41A. Furthermore, the computing machine 43A and the input/output signal conversion device 47A are connected by, for example, an HDMI standard cable 402 and a USB standard cable 403.

The central computing system 5A includes, for example, a central computing machine 53A, a delay control device 52A, and a transmission device 54A.

The central computing machine 53A transmits and receives signals to and from the computing system 4A, and performs processing in accordance with the content.

The delay control device 52A measures an amount of delay between the central computing system 5A and the computing system 4A and controls the amount of delay.

The transmission device 54A receives a signal from the computing system 4A, and transmits a signal from the transmission device 54A itself to the computing system 4A.

Note that the implementation example illustrated in FIG. 6 is an example, and the implementation is not limited thereto. Other components may be included, and as described above, the delay control device may be included in, for example, one of the user system 3A and the computing system 4A in accordance with the intended use.

<Examples of Target of Delay Adjustment>

Figure 7:
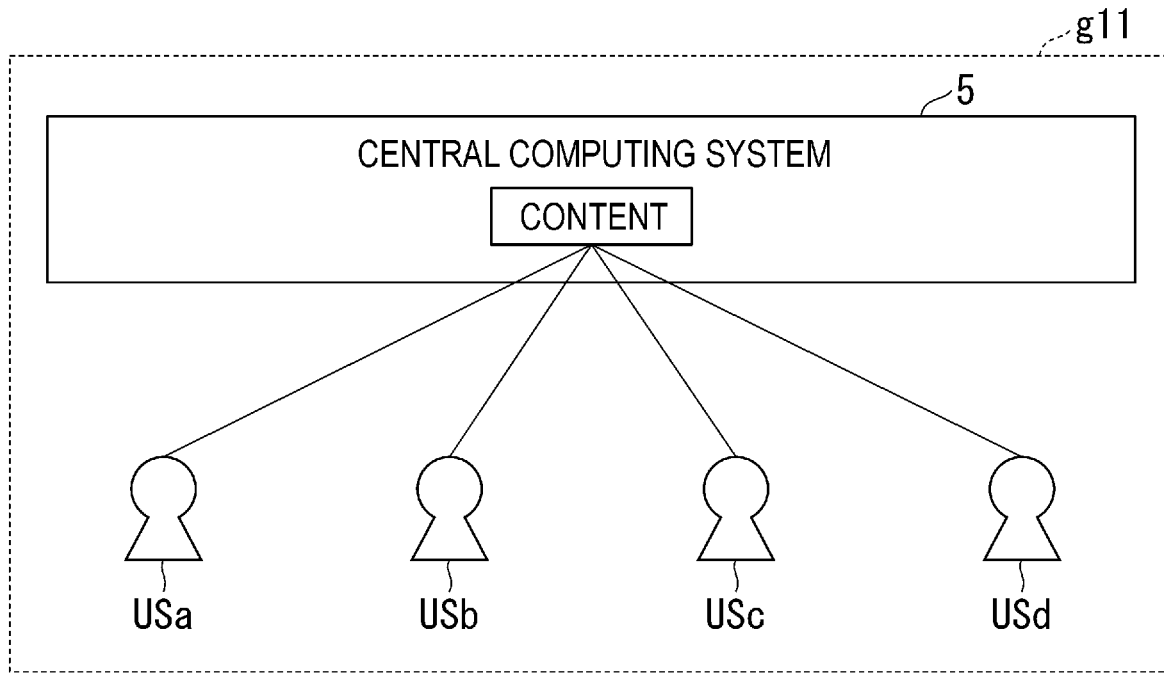
FIG. 7 is a diagram illustrating a first example of a target of delay adjustment.
Figure 8:
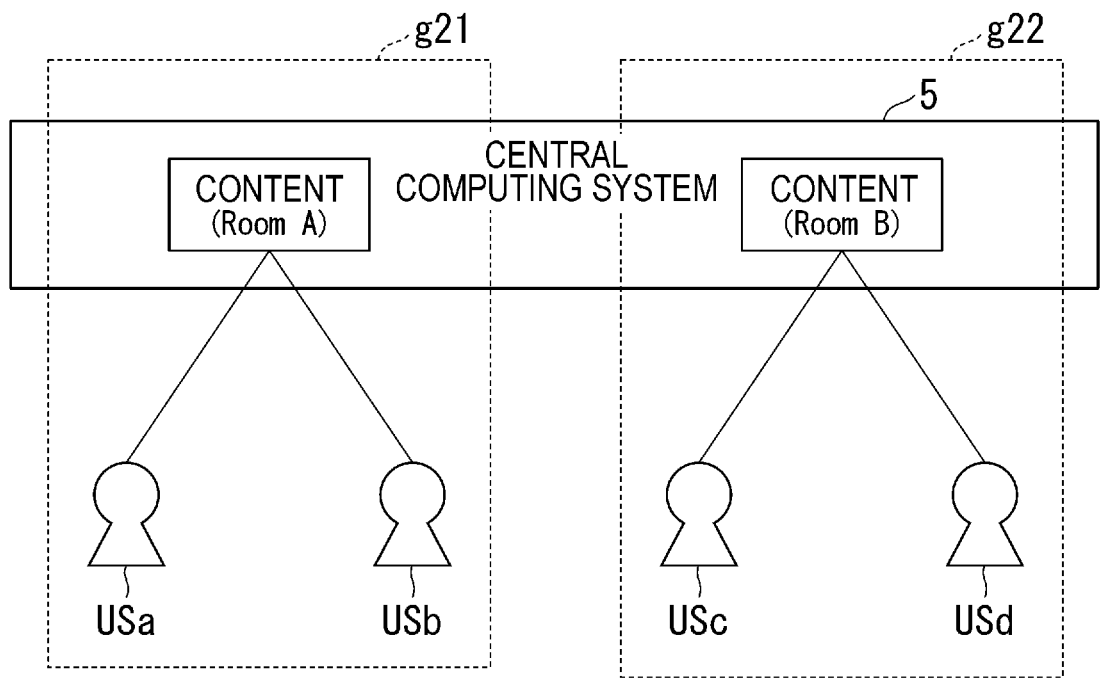
FIG. 8 is a diagram illustrating a second example of a target of delay adjustment.
Figure 9:
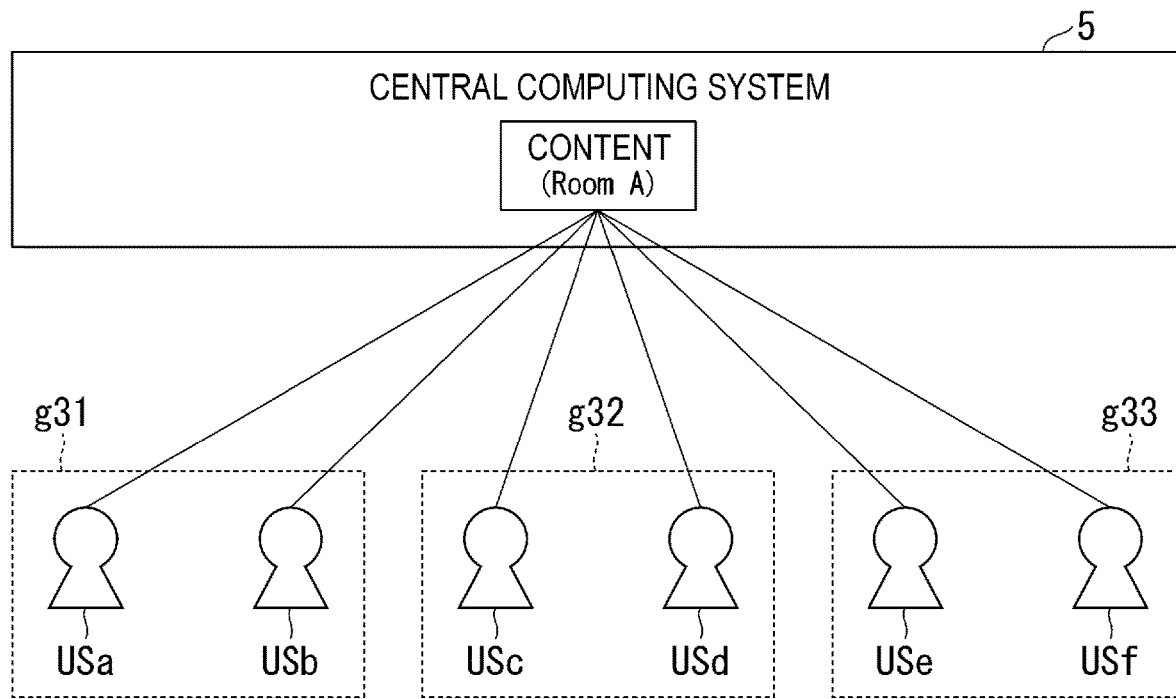
FIG. 9 is a diagram illustrating a third example of a target of delay adjustment.

Here, examples of a target of delay adjustment will be described with reference to FIGS. 7 to 9. Setting a target user for delay adjustment as illustrated in FIGS. 7 to 9 enables adjustment by a minimum amount of delay. At the time of target determination, the delay adjustment device 6 acquires user information and information regarding running of the content (e.g., a list of users who use content Room A) from the central computing machine 53 on which the content runs, and thus determines a user to be delayed.

First, terms and the like used in the following description will be defined.

A room means, for example, a cluster of users who can interact with the content played by the users. For example, in a case of a mahjong game, the room is constituted by four users. For example, in a case where participating users have been fixed in advance, the room may be determined by the users. Alternatively, the system may determine users who join a room in a case where, for example, a single player of an online game joins matching and is assigned to a room of up to 10 users.

A group of users is assumed to be a unit of team in content such as team vs team in eSports, for example. In a case where, for example, a team and a group of users are matched in a situation such as team vs team in eSports, the group of users may be determined by the users. Alternatively, the system may select users who join a group of users in a case where, for example, a single player of an online game joins the same team with other users and plays team vs team.

In the example described below, the amount of delay is adjusted on a content-by-content or room-by-room basis.

FIG. 7 is a diagram illustrating a first example of a target of delay adjustment. In the first example in FIG. 7, four users a to d are using content in one room with the use of user systems 3-$m$ (m represents a to d) and computing systems 4-$m$. As described above, in a case where four users are using one piece of content, a range g11 including all of the user systems 3-$m$ (m represents a to d), the computing systems 4-$m$, and the central computing system 5 is the target of delay amount adjustment.

FIG. 8 is a diagram illustrating a second example of a target of delay adjustment. In the second example in FIG. 8, the two users a and b are using content in Room A with the use of the user systems 3-$a$ and 3-$b$ and the computing systems 4-$a$ and 4-$b$. In addition, the two users c and d are using content in Room B with the use of the user systems 3-$c$ and 3-$d$ and the computing systems 4-$c$ and 4-$d$. In such a case, a range g21 including the user systems 3-$a$ and 3-$b$, the computing systems 4-$a$ and 4-$b$, and the central computing system 5 being used by a group of the users a and b in Room A is a first range of delay amount adjustment. In addition, a range g22 including the user systems 3-$c$ and 3-$d$, the computing systems 4-$c$ and 4-$d$, and the central computing system 5 being used by a group of the users c and d in Room B is a second range of delay amount adjustment. In the example in FIG. 8, the delay adjustment device 6 and each of the delay control devices adjust the amounts of delay in units of two or more clusters of users who are allowed to interact with each other in the same content. A method of adjusting the amount of delay in such a case will be described later.

FIG. 9 is a diagram illustrating a third example of a target of delay adjustment. The third example in FIG. 9 is an example in which six users a to f using one piece of content are divided into two or more clusters of users who are allowed to interact with each other in the same content. In the example in FIG. 9, the delay adjustment device 6 and each of the delay control devices adjust the amounts of delay in units of two or more groups of users in two or more clusters of users who are allowed to interact with each other in the same content. A method of adjusting the amount of delay in such a case will be described later.

The description using FIG. 5 is based on the assumption that the difference in delay can be reduced to zero between a plurality of users who use the content.

On the other hand, there may be a case where a plurality of users who are targeted have a difference in delay that exceeds an adjustment amount that can be adjusted by the delay control devices. In such a case, a situation may arise in which adjustment by an adjustable maximum amount of delay still results in environments that are not fair for one or more users. An example of an adjustment method in such a case will be described in the following examples.

First Example

In a first example, only a cluster of users for which delay can be adjusted is created in advance as a measure in advance.

Information regarding the amount of delay of each user is transmitted from the delay adjustment device 6 side to the central computing machine side on which content runs. The central computing machine 53 selects users who join a room or a group of users on the basis of the received information regarding the amount of delay. Thus, according to the first example, only users with adjustable amounts of delay can be grouped in the same room or the same group of users. As a result, the first example allows for prevention of a situation in which the environments are not fair for one or more users.

Second Example

In a second example and a third example, pseudo fair environments are established as a posterior measure. In a case where the first example does not work, pseudo fair environments may be established as described below.

A method of adjusting the amount of delay in a case as illustrated in FIG. 8 will be described with reference to FIGS. 10 to 13. Note that, in the present example, a case where there are two users will be described as an example for ease of description, but the number of users is not limited thereto. The first example is a case where content is attended in units of one user. Here, an example will be described in which pseudo fair environments are established as a posterior measure.

Figure 10:
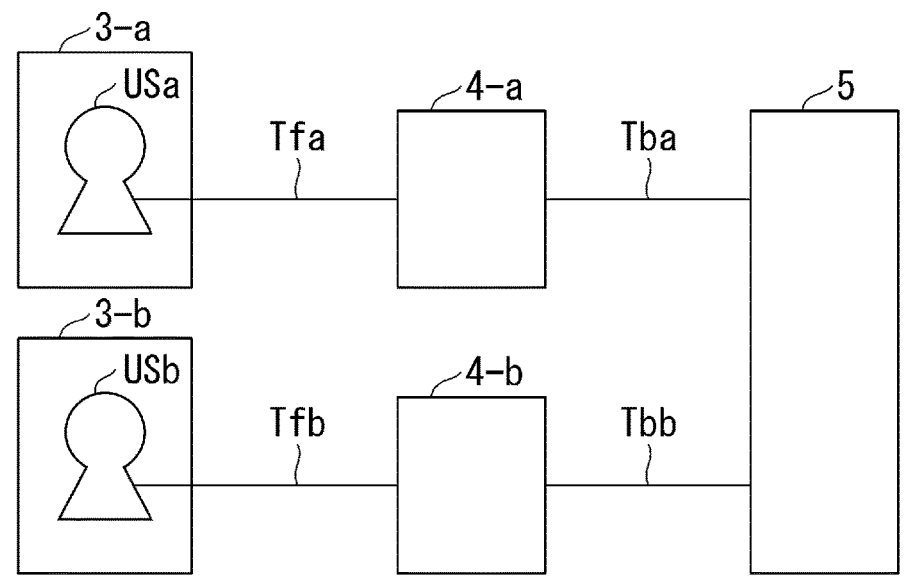
FIG. 10 is a schematic configuration diagram of an information processing system in a first example.

FIG. 10 is a schematic configuration diagram of an information processing system in the first example. In the example in FIG. 10, the user a is using the user system 3-$a$ and the computing system 4-$a$, and the user b is using the user system 3-$b$ and the computing system 4-$b$.

Figure 11:
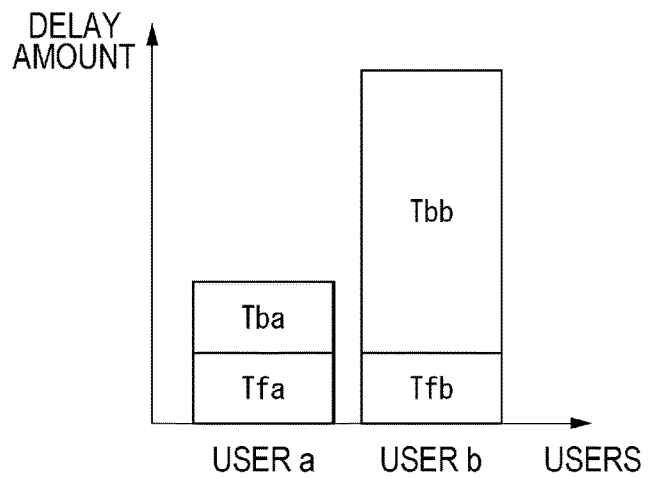
FIG. 11 is a diagram illustrating an amount of delay without adjustment in the first example.

FIG. 11 is a diagram illustrating an amount of delay without adjustment in the first example. In FIG. 11, the horizontal axis represents users, and the vertical axis represents the amount of delay (e.g., (ms)).

In FIGS. 10 and 11, it is assumed that the amount of delay Tfa between the user system 3-$a$ and the computing system 4-$a$ is 10 (ms), and the amount of delay Tba between the computing system 4-$a$ and the central computing system 5 is 10 (ms). In addition, it is assumed that the amount of delay Tfb between the user system 3-$b$ and the computing system 4-$b$ is 10 (ms), and the amount of delay Tbb between the computing system 4-$b$ and the central computing system 5 is 40 (ms).

Figure 12:
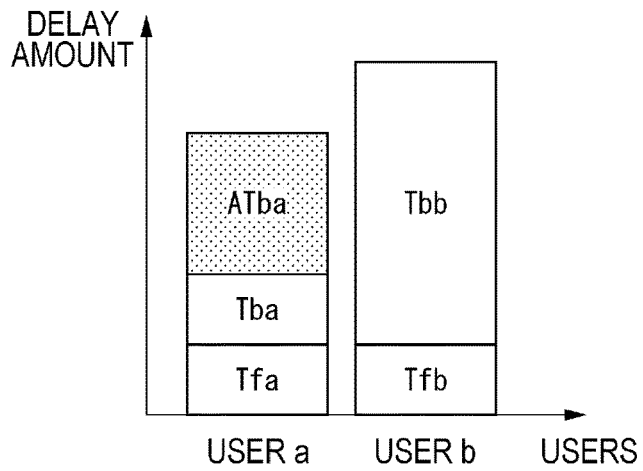
FIG. 12 is a diagram illustrating an example of a case where a maximum amount of delay of a computing system has been added in the first example.

FIG. 12 is a diagram illustrating an example of a case where a maximum amount of delay of a computing system has been added in the first example. The axes in FIG. 12 are similar to those in FIG. 11. For example, it is assumed that the maximum amount of delay that can be adjusted by each of the delay control devices (33, 42, 44, and 52) is 20 (ms). Thus, for example, it is not possible to adjust the amounts of delay of the user a and the user b to be equivalent by a second delay control device 44-$a$ of the computing system 4-$a$ adding 20 (ms) as the adjustment delay amount ATba.

Figure 13:
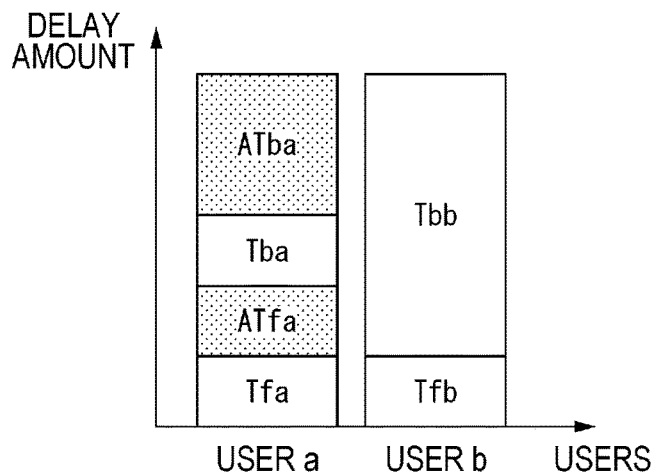
FIG. 13 is a diagram illustrating an example of end-to-end adjustment of the computing system in the first example.

FIG. 13 is a diagram illustrating an example of end-to-end adjustment of the computing system in the first example. The axes in FIG. 13 are similar to those in FIG. 11.

In a case where there is a plurality of communication sections as illustrated in FIG. 10, the amounts of delay are adjusted so as to achieve end-to-end (e.g., between a user system and a central computing system) equalization of the amounts of delay, instead of adjustment for each communication section. In addition, the delay adjustment device 6 and each delay control unit use this means to perform control such that the difference in delay is reduced to close to zero as much as possible.

In this case, for example, the second delay control device 44-*a* of the computing system 4-*a* adds 20 (ms) as the adjustment delay amount ATba, and a first delay control device 42-*a* of the computing system 4-*a* adds 10 (ms) as the adjustment delay amount ATfa, so that the total amount of delay of the user a is adjusted to be 40 (ms), which is equivalent to that of the user b.

In the example described above, the adjustment delay amount ATba is larger than the adjustment delay amount ATfa, but the adjustment delay amount ATfa may be larger than the adjustment delay amount ATba, or the adjustment delay amount Alba and the adjustment delay amount Alfa may be the same.

Third Example

Next, a method of adjusting the amount of delay in a case as illustrated in FIG. 9 will be described with reference to FIGS. 14 to 17. Note that, in the present example, a case where there are four users will be described as an example for ease of description, but the number of users is not limited thereto. In the present example, an example of adjusting the amount of delay in consideration of the amount of delay between groups of users will be described.

Figure 14:
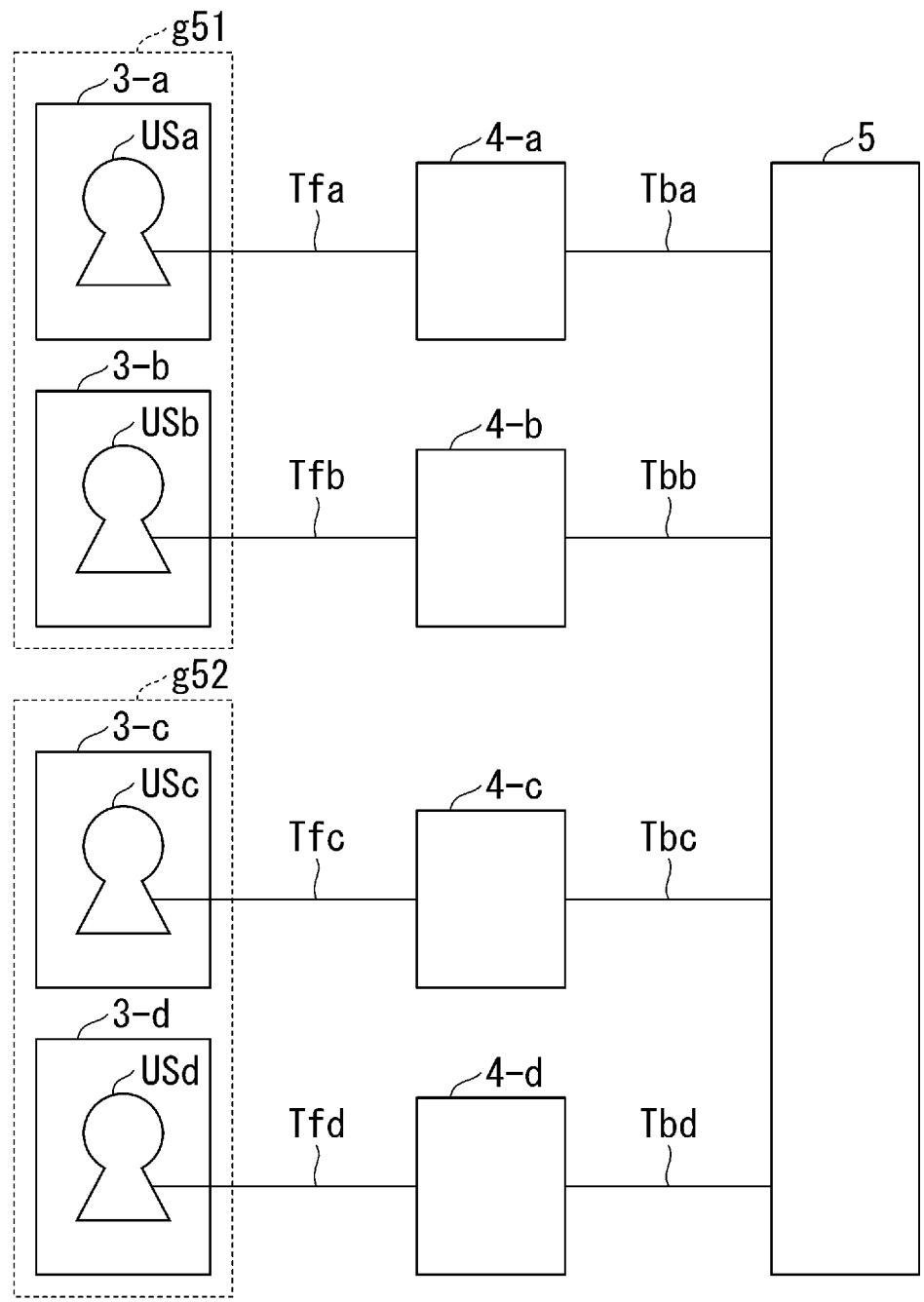
FIG. 14 is a schematic configuration diagram of an information processing system in a second example.

FIG. 14 is a schematic configuration diagram of an information processing system in the second example. In the example in FIG. 14, for example, the users a and b in a user group g51 are using Room A, and the users c and d in a user group g52 are using Room B.

Figure 15:
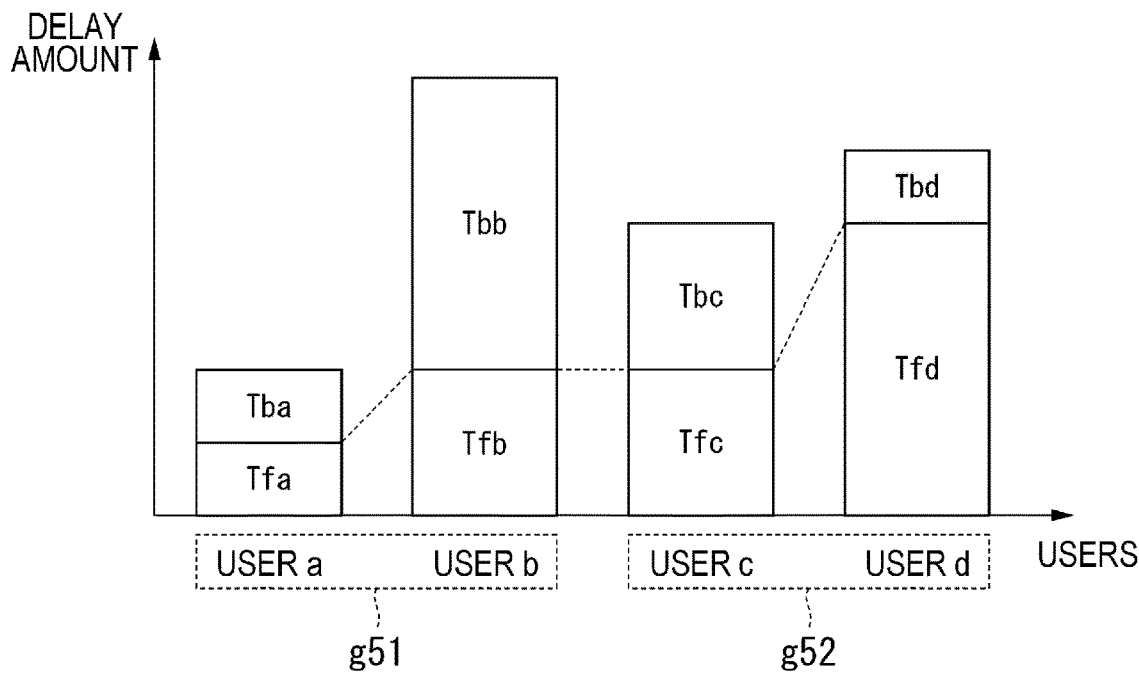
FIG. 15 is a diagram illustrating an amount of delay without adjustment in the second example.

FIG. 15 is a diagram illustrating an amount of delay without adjustment in the second example. In FIG. 15, the horizontal axis represents users, and the vertical axis represents the amount of delay (e.g., (ms)).

In FIGS. 14 and 15, it is assumed that the amount of delay Tfa between the user system 3-*a* and the computing system 4-*a* is 10 (ms), and the amount of delay Tba between the computing system 4-*a* and the central computing system 5 is 10 (ms). It is assumed that the amount of delay Tfb between the user system 3-*b* and the computing system 4-*b* is 20 (ms), and the amount of delay Tbb between the computing system 4-*b* and the central computing system 5 is 40 (ms).

It is assumed that the amount of delay Tfc between the user system 3-*c* and the computing system 4-*c* is 20 (ms), and an amount of delay Tbc between the computing system 4-*c* and the central computing system 5 is 20 (ms). It is assumed that the amount of delay Tfd between the user system 3-*d* and the computing system 4-*d* is 40 (ms), and an amount of delay Tbd between the computing system 4-*d* and the central computing system 5 is 10 (ms).

Also in the present example, it is assumed that the maximum value of the adjustable amount of delay of each of the delay control devices is 20 (ms).

Figure 16:
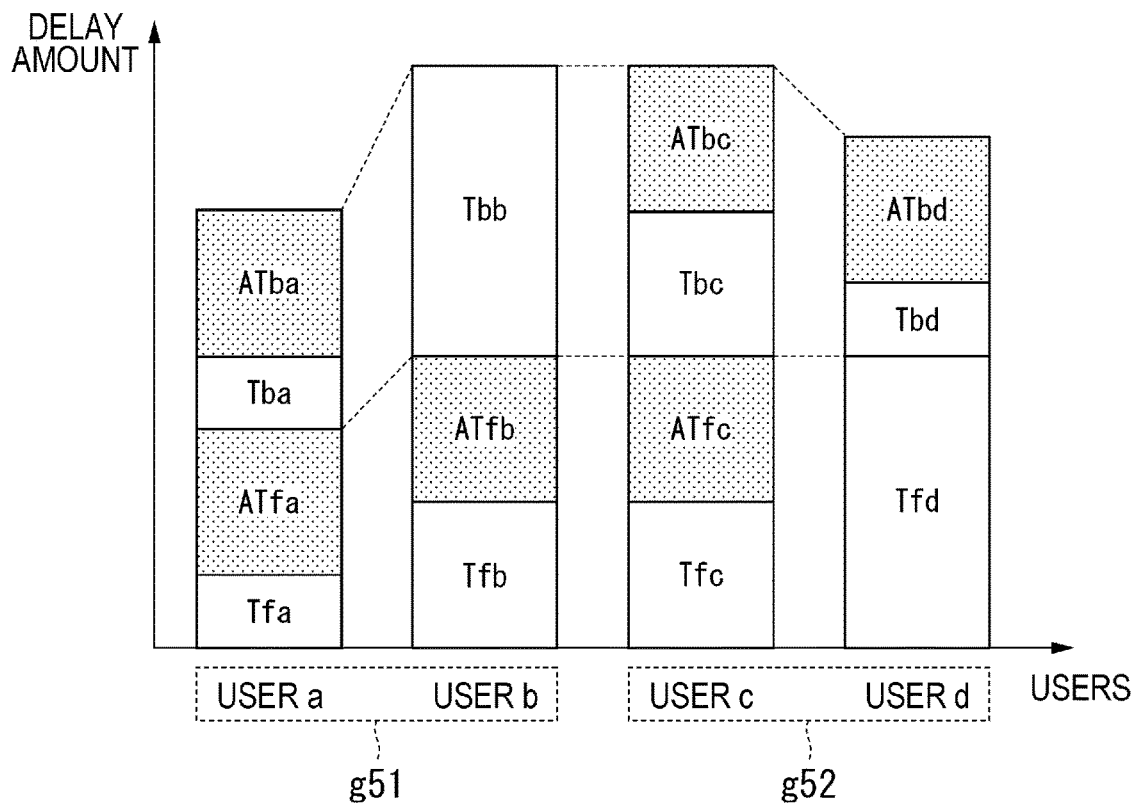
FIG. 16 is a diagram illustrating an example of a case where a maximum amount of delay of a computing system has been added in the second example.

FIG. 16 is a diagram illustrating an example of a case where a maximum amount of delay of a computing system has been added in the second example. The axes in FIG. 16 are similar to those in FIG. 15.

In the example in FIG. 16, for example, the second delay control device 44-*a* of the computing system 4-*a* adds (ms) as the adjustment delay amount Alba, and the first delay control device 42-*a* of the computing system 4-*a* adds (ms) as the adjustment delay amount Alfa. Furthermore, for example, a first delay control device 42-*b* of the computing system 4-*b* adds 20 (ms) as the adjustment delay amount ATfb.

For example, a second delay control device 44-*c* of the computing system 4-*c* adds 20 (ms) as an adjustment delay amount ATbc, and a first delay control device 42-*c* of the computing system 4-*c* adds 20 (ms) as an adjustment delay amount ATfc. In addition, for example, a second delay control device 44-*d* of the computing system 4-*d* adds (ms) as an adjustment delay amount ATbd.

Figure 17:
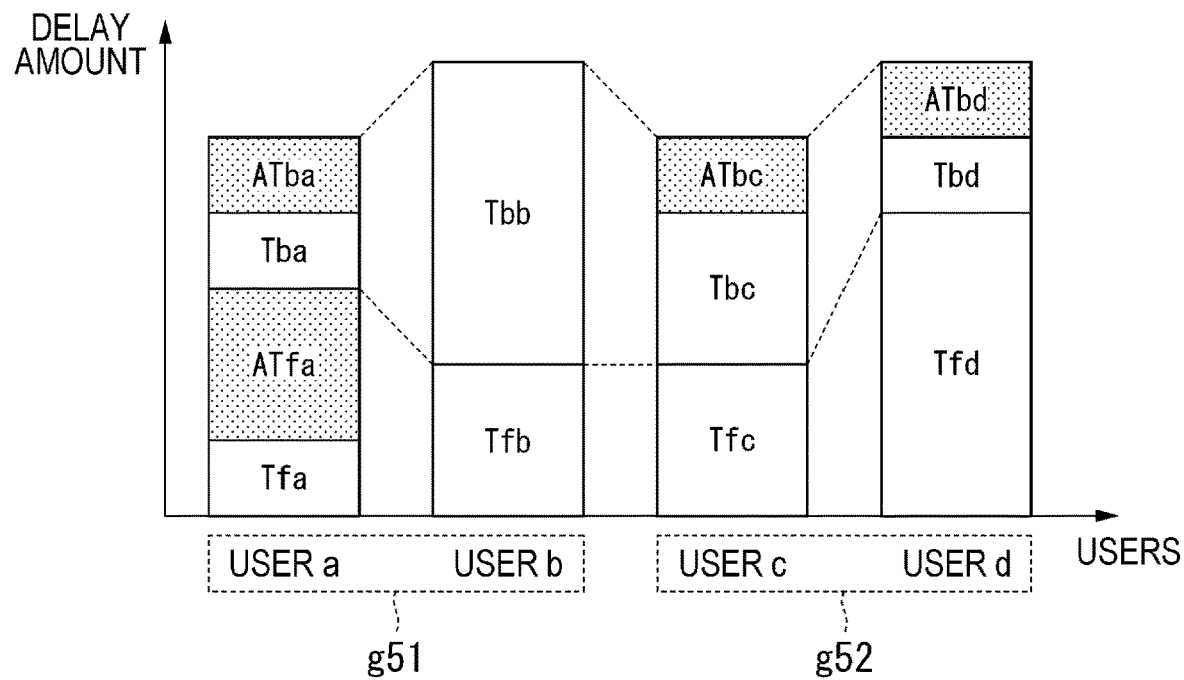
FIG. 17 is a diagram illustrating an example of a case where the amount of delay is adjusted between groups of users in the second example.

FIG. 17 is a diagram illustrating an example of a case where the amount of delay is adjusted between groups of users in the second example. The axes in FIG. 17 are similar to those in FIG. 15.

In FIG. 17, the adjustment delay amount ATfa is 20 (ms), the adjustment delay amount ATba is 10 (ms), the adjustment delay amount ATbc is 10 (ms), and the adjustment delay amount ATbd is 10 (ms).

In this case, a total amount of delay Ta of the user a is 50 (=10+20+10+10) (ms), a total amount of delay Tb of the user b is 60 (=20+40) (ms), and the average total amount of delay of the user group g51 is 55 (=(50+60)/2) (ms).

Furthermore, the total amount of delay Ta of the user c is 50 (=20+20+10) (ms), a total amount of delay Td of the user d is 60 (=40+10+10) (ms), and the average total amount of delay of the user group g52 is 55 (=(50+60)/2) (ms).

In the present example, for example, delay adjustment in consideration of groups of users may be performed by adjusting the average delays so as to be equalized between the groups of users. In the second example, adjustment may be made as in the first example.

This allows for delay adjustment considering the amounts of delay between groups of users in which fairness is maintained in units of teams and the absolute amount of delay is suppressed.

<Application Pattern Examples>

Next, application pattern examples of the above-described embodiment will be described.

Figure 18:
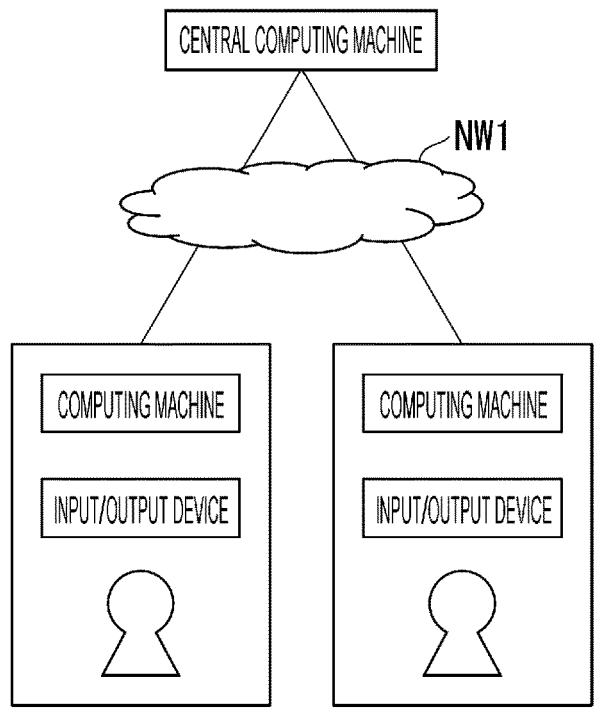
FIG. 18 is a diagram illustrating a first application pattern.

FIG. 18 is a diagram illustrating a first application pattern. The first application pattern is a "local type", in which a computing machine on which content such as a game runs exists in the same site as a user. In such a case, an input/output device and the computing machine are connected without a network, and the amount of delay between the input/output device and the computing machine is small. Therefore, in the first application pattern, the amount of delay is adjusted by adding an adjustment delay amount ATbn for the difference in the amount of delay due to the first networks NW1 between the computing machines and the central computing machine.

Figure 19:
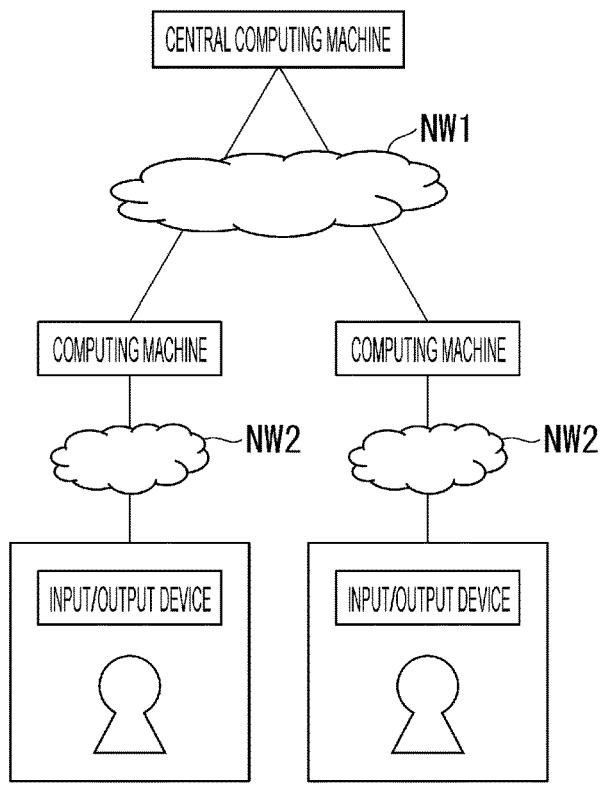
FIG. 19 is a diagram illustrating a second application pattern.

FIG. 19 is a diagram illustrating a second application pattern. The second application pattern is a "fog type", in which a computing machine on which content such as a game runs exists in a site different from that of a user (e.g., the computing machine is physically or logically arranged closer to the user than to the central computing machine). The configuration example in FIG. 1 corresponds to the second application pattern. In this case, an amount of delay occurs in each of the second networks NW2 between the input/output devices and the computing machines, and the first networks NW1 between the computing machines and the central computing machine. Therefore, in the second application pattern, adjustment of the amount of delay is performed by adding the adjustment delay amount ATbn for the difference in the amount of delay due to the first networks NW1 between the computing machines and the central computing machine, and adding an adjustment delay amount ATfn for the difference in the amount of delay due to the second networks NW2 between the computing machines and the input/output devices.

Figure 20:
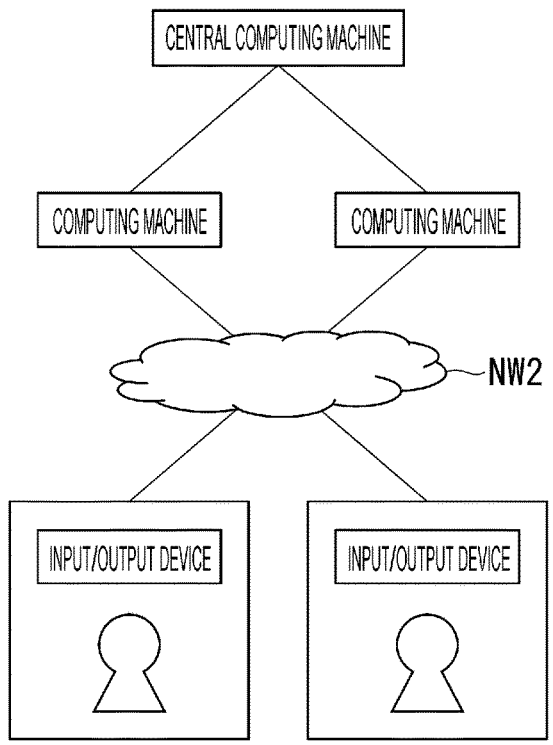
FIG. 20 is a diagram illustrating a third application pattern.
Figure 21:
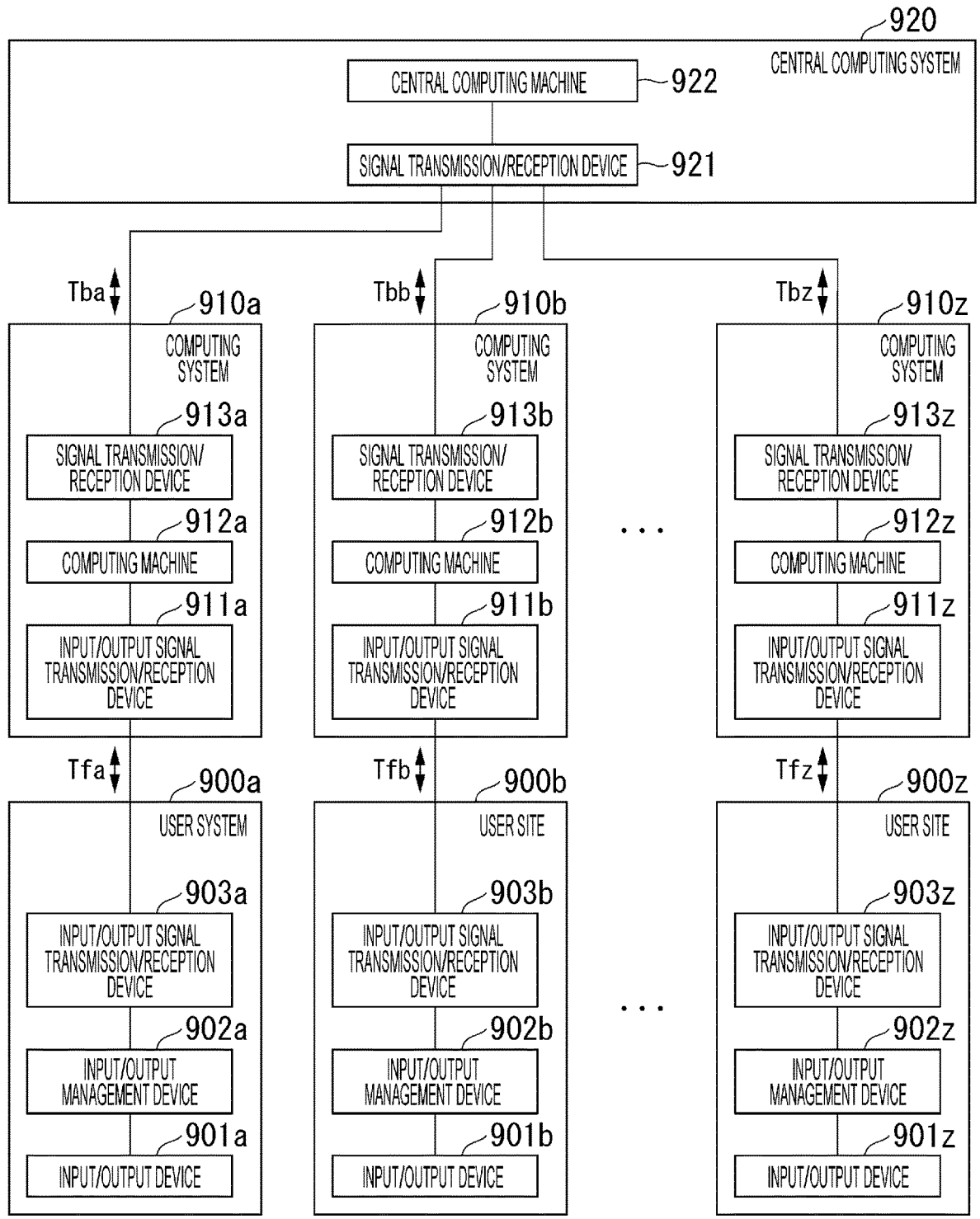
FIG. 21 is a diagram illustrating a configuration example of an information processing system in a conventional technology.
Figure 22:
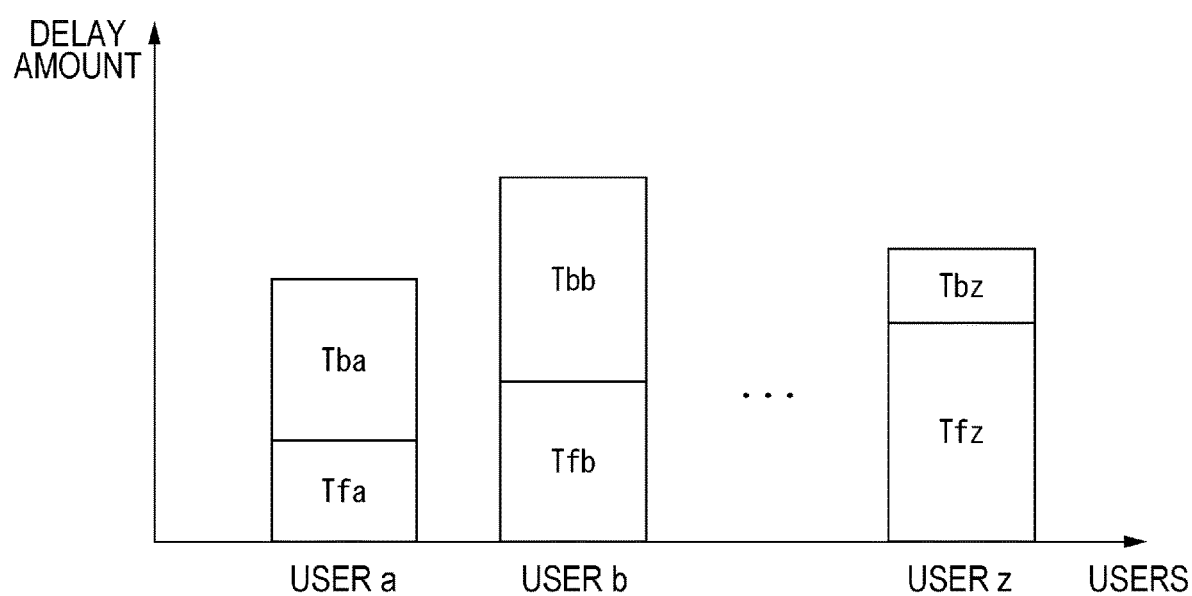
FIG. 22 is a diagram illustrating an amount of delay of each user in a conventional technology.

FIG. 20 is a diagram illustrating a third application pattern. The third application pattern is a "cloud type", in which a computing machine on which content such as a game runs exists in a cloud, and a central computing machine also exists in the cloud. In this case, the amount of delay is adjusted by adding the adjustment delay amount Atfn for the amount of delay due to the second networks NW2 between the computing machines and the input/output devices.

Note that the application patterns illustrated in FIGS. 18 to 20 are examples, the classification is merely for convenience, and some pieces of cloud gaming are close to the form of fog gaming.

Furthermore, the amount of delay may be adjusted by a combination of the first to third application patterns described above in accordance with the configuration of the information processing system 1.

Modification

Here, a modification will be described.

The technique and configuration of the present embodiment can be applied also to a case where the central computing machine has a multi-stage structure. In that case, the relationship between the central computing machine and the computing machine may be adapted to a relationship between a central computing machine (upper level) and a central computing machine (lower level). In this case, adjustment of the amount of delay may be targeted at the following three: an amount of delay Tfn between the input/output device and the computing machine, an amount of delay Tb1n between the computing machine and the central computing machine, and an amount of delay Tb2n between the central computing machine (upper level) and the central computing machine (lower level). In such a case, for example, a delay control device may be provided between the central computing machine (upper level) and the central computing machine (lower level).

As described above, according to the embodiment, the examples, and the modification, the amounts of delay between the central computing machine and the computing machine and between the computing machine and the input/output device are measured and the amounts of delay are adjusted, and thus the amounts of delay between a plurality of users having different communication environments can be kept constant. As a result, according to the embodiment, the examples, and the modification, it is possible to equalize the amounts of delay among participants in a highly competitive event, and thus, fairness is maintained.

Note that each implementation example described above is an example, and the implementation configuration is not limited thereto. For example, another device or the like may be connected to the user systems 3, the computing systems 4, and the central computing system 5.

Although the embodiment of the present invention has been described in detail with reference to the drawings so far, a specific configuration is not limited to this embodiment, and includes a design and the like without departing from the scope of the present invention.

INDUSTRIAL APPLICABILITY

The present invention is applicable to, for example, a gaming system, an eSports system, a remote desktop system, or a computing machine rental system.

REFERENCE SIGNS LIST

1 Information processing system
3 User system
4 Computing system
5 Central computing system
6 Delay adjustment device
31 Input/output device
32 Input/output management device
33 Delay control device
34 Input/output signal transmission/reception device
41 Input/output signal transmission/reception device
42 Delay control device
43 Computing machine
44 Delay control device
45 Signal transmission/reception device
51 Signal transmission/reception device
52 Delay control device
53 Central computing machine
NW1 First network
NW2 Second network

The invention claimed is:

1. An information processing method in an information processing system comprising a plurality of input/output devices to be used by a plurality of users, a plurality of computing machines connected to the plurality of input/output devices, and a central computing machine connected to the plurality of computing machines, in which a connection between the input/output device and the plurality of computing machines is made via a network and a connection between the plurality of computing machines and the central computing machine is made via the network, and the fall plurality of users uses a same content by using the plurality of input/output devices via the network, the method comprising:

measuring, by a delay measurement device comprising a processor configured to execute a program, an amount of transmission delay generated between each of the input/output devices and the central computing machine for each of the plurality of users; and adjusting, by a delay adjustment device, a difference in the amount of transmission delay between the plurality of users to be kept within a predetermined value on the basis of the measured amount of transmission delay, wherein the adjusting of the difference comprises:

adjusting the amount of transmission delay in units of one or more groups of users, which are created on the basis of the amount of transmission delay for each of the plurality of users and include only users in which the difference in the amount of transmission delay between the plurality of users can be adjusted to be kept within the predetermined value; and adjusting the amount of transmission delay so as to achieve end-to-end equalization of the amount of transmission delay, instead of adjustment for each communication section, in a case where there is a plurality of communication sections in the connection between the input/output devices and the plurality of computing machines and the connection between the plurality of computing machines and the central computing machine.

2. An information processing system comprising a plurality of input/output devices to be used by a plurality of users, a plurality of computing machines connected to the plurality of input/output devices, and a central computing machine connected to the plurality of computing machines, in which a connection between the input/out devices and the plurality of computing machines is made via a network and a connection between the the plurality of computing machines and the central computing machine is made via the network, and the plurality of users uses a same content by using the plurality of input/output devices via the network, the information processing system comprising:
   a delay measurement device comprising a processor configured to execute a program to measure an amount of transmission delay generated between each of the input/output devices as and the central computing machine for each of the plurality of users; and
   a delay adjustment device configured to adjust a difference in the amount of transmission delay between the plurality of users to be kept within a predetermined value on the basis of the measured amount of transmission delay,
   wherein the delay adjustment device is further configured to:
   adjust the amount of transmission delay in units of one or more groups of users, which are created on the basis of the amount of transmission delay for each of the plurality of users and include only users in which the difference in the amount of transmission delay between the plurality of users can be adjusted to be kept within the predetermined value; and
   adjust the amount of transmission delay so as to achieve end-to-end equalization of the amount of transmission delay, instead of adjustment for each communication section, in a case where there is a plurality of communication sections in the connection between the input/output devices and the plurality of computing machines and the connection between the plurality of computing machines and the central computing machine.

3. The information processing system according to claim 2, wherein
   the delay adjustment device is configured to adjust the amount of transmission delay to make the amount of transmission delay be equal between the users.

4. The information processing system according to claim 2, wherein
   the network comprises a circuit-switched network.

5. The information processing system according to claim 2, wherein
   the delay adjustment device is configured to adjust the amount of transmission delay in units of two or more clusters of users who are allowed to interact with each other in the same content.

6. The information processing system according to claim 5, wherein
   the delay adjustment device is configured to adjust the amounts of transmission delay in units of two or more groups of users in the clusters of users.

7. A non-transitory computer readable storage medium storing a program for causing a computer of a delay adjustment device in an information processing system comprising a plurality of input/output devices to be used by a plurality of users, a plurality of computing machines connected to the plurality of input/output devices, and a central computing machine connected to the plurality of computing machines, in which a connection between the input/output devices and the plurality of computing machines is made via a network and a connection between the the plurality of computing machines and the central computing machine is made via the network, and the plurality of users uses a same content by using the plurality of input/output devices via the network, to execute:
   measurement of an amount of transmission delay generated between each of the input/output devices and the central computing machine for each of the plurality of users; and
   adjustment of a difference in the amount of transmission delay between the users to be kept within a predetermined value on the basis of the measured amount of transmission delay,
   wherein the adjusting of the difference comprises:
   adjusting the amount of transmission delay in units of one or more groups of users, which are created on the basis of the amount of transmission delay for each of the plurality of users and include only users in which the difference in the amount of transmission delay between the plurality of can be adjusted to be kept within the predetermined value; and
   adjusting the amount of transmission delay so as to achieve end-to-end equalization of the amount of transmission delay, instead of adjustment for each communication section, in a case where there is a plurality of communication sections in the connection between the input/output devices and the plurality of computing machines and the connection between the plurality of computing machines and the central computing machine.

* * * * *